(12) United States Patent
McKay

(10) Patent No.: US 7,309,182 B2
(45) Date of Patent: Dec. 18, 2007

(54) LIQUID DISPENSING BRUSH

(75) Inventor: William D. McKay, Grand Blanc, MI (US)

(73) Assignee: The Hartz Mountain Corporation, Secaucus, NJ (US)

( * ) Notice: Subject to any disclaimer, the term of this patent is extended or adjusted under 35 U.S.C. 154(b) by 263 days.

(21) Appl. No.: 10/930,419

(22) Filed: Aug. 31, 2004

(65) Prior Publication Data

US 2005/0063764 A1   Mar. 24, 2005

Related U.S. Application Data

(63) Continuation-in-part of application No. 10/851,503, filed on May 21, 2004, and a continuation-in-part of application No. 10/812,475, filed on Mar. 30, 2004, which is a continuation-in-part of application No. 10/717,956, filed on Nov. 20, 2003, which is a continuation-in-part of application No. 10/672,909, filed on Sep. 26, 2003, which is a continuation-in-part of application No. 10/614,551, filed on Jul. 7, 2003, which is a continuation-in-part of application No. 10/329,717, filed on Dec. 26, 2002, now Pat. No. 7,039,982, which is a continuation-in-part of application No. 10/302,038, filed on Nov. 22, 2002, now Pat. No. 6,763,977, which is a continuation-in-part of application No. 10/143,396, filed on May 10, 2002, now Pat. No. 6,698,626.

(51) Int. Cl.
*A47L 1/08* (2006.01)
*A45D 44/18* (2006.01)

(52) U.S. Cl. ............... 401/138; 401/129; 132/313

(58) Field of Classification Search ........ 401/136–139, 401/179, 188 R, 129; 132/313
See application file for complete search history.

(56) References Cited

U.S. PATENT DOCUMENTS

| | | | |
|---|---|---|---|
| 717,377 A | 12/1902 | Flanders | |
| 2,127,886 A | 8/1938 | Plon | |
| 2,363,647 A | 11/1944 | Cosin | |
| 2,529,927 A | 11/1950 | Fisk | |
| 2,694,826 A | 11/1954 | Blakely | |
| 2,888,698 A | 6/1959 | Kaye et al. | |
| 2,920,334 A | 1/1960 | Keller | |
| 2,922,180 A | 1/1960 | Render | |
| 3,011,499 A | 12/1961 | Tajan | 401/139 |
| 3,034,376 A | 5/1962 | Gonzalez | |
| 3,056,154 A | 10/1962 | Neal | 15/104 |
| 3,060,485 A | 10/1962 | Butter et al. | |
| 3,102,544 A | 9/1963 | Keegan et al. | 132/147 |
| 3,128,487 A | 4/1964 | Vallis | |
| 3,158,887 A | 12/1964 | Kanbar et al. | 15/104 |
| 3,299,461 A | 1/1967 | Marks | 15/104 |
| 3,373,457 A | 3/1968 | Rouch, Jr. | 15/104 |
| 3,665,543 A | 5/1972 | Nappi | 15/215 |
| 3,742,547 A | 7/1973 | Sohmer | 15/104 |
| 3,755,847 A | 9/1973 | Liebscher | |

(Continued)

*Primary Examiner*—Khoa D. Huynh
(74) *Attorney, Agent, or Firm*—Gottlieb, Rackman & Reisman

(57) ABSTRACT

A cleaning apparatus includes a substrate with outward projecting bristles. The substrate may be mounted on a support which may carry a handle or on a media dispensing container. The handle is hollow to carry a dispensable media from a dispenser mounted on the handle or has an open end to receive an aerosol or media dispensing container.

4 Claims, 24 Drawing Sheets

U.S. PATENT DOCUMENTS

| | | |
|---|---|---|
| 3,833,008 A | 9/1974 | Blackett, Jr. |
| 4,062,083 A | 12/1977 | McKay .................. 15/106 |
| 4,107,811 A | 8/1978 | Imsande ................ 15/215 |
| 4,244,587 A | 1/1981 | Schweizer ............ 15/104.8 |
| 4,307,739 A | 12/1981 | Chern |
| 4,357,730 A | 11/1982 | Lex |
| 4,361,923 A | 12/1982 | McKay .................. 15/104 |
| 4,399,579 A | 8/1983 | McKay .................. 15/104 |
| 4,422,201 A | 12/1983 | McKay .................. 15/104 |
| 4,500,939 A | 2/1985 | Gueret |
| 4,517,703 A | 5/1985 | Koke |
| 4,603,448 A | 8/1986 | Middleton et al. |
| 4,727,616 A | 3/1988 | Kucera et al. ........... 15/104 |
| 4,850,073 A | 7/1989 | Preuss ................ 15/207.2 |
| 4,856,541 A | 8/1989 | Kellett et al. |
| 4,884,688 A | 12/1989 | Hurst |
| 4,905,337 A | 3/1990 | McKay .................. 15/104 |
| 5,002,075 A | 3/1991 | Kellett et al. |
| 5,027,465 A | 7/1991 | McKay .................. 15/104 |
| D320,680 S | 10/1991 | Stetson et al. ......... D30/158 |
| 5,052,071 A | 10/1991 | Halm ................. 15/167.1 |
| 5,261,426 A | 11/1993 | Kellett et al. |
| D342,610 S | 12/1993 | Stetson et al. ......... D4/122 |
| 5,410,772 A | 5/1995 | Lewis |
| D363,214 S | 10/1995 | Parola et al. .......... D9/300 |
| 5,519,912 A | 5/1996 | Kawamura |
| 5,600,865 A | 2/1997 | Morrison |
| 5,651,158 A | 7/1997 | Halm ................. 15/167.1 |
| 5,746,531 A * | 5/1998 | Izhak ................... 401/139 |
| 5,819,989 A | 10/1998 | Saraceni ............... 221/192 |
| 5,862,563 A | 1/1999 | Hartmann |
| 5,878,457 A | 3/1999 | Cox et al. ........... 15/104.002 |
| 5,887,600 A | 3/1999 | Wilk |
| 5,890,255 A | 4/1999 | Robinson |
| 5,904,150 A | 5/1999 | Caristo et al. |
| 6,006,393 A | 12/1999 | Lynch et al. ........... 15/144.1 |
| 6,014,788 A | 1/2000 | Jaffri ............... 15/104.002 |
| 6,021,542 A | 2/2000 | Norman |
| 6,029,307 A | 2/2000 | Baudoin |
| 6,055,695 A | 5/2000 | McKay, Jr. ......... 15/104.002 |
| 6,070,597 A | 6/2000 | Motherhead |
| 6,098,635 A | 8/2000 | Marino ................. 132/238 |
| 6,112,362 A | 9/2000 | Parko et al. |
| 6,127,014 A | 10/2000 | McKay, Jr. ............. 428/43 |
| 6,213,129 B1 * | 4/2001 | Muldoon ............... 401/139 |
| 6,230,716 B1 | 5/2001 | Minoletti |
| 6,280,757 B1 | 8/2001 | McAfee et al. ......... 424/402 |
| 6,298,517 B1 | 10/2001 | McKay .................. 15/228 |
| 6,325,070 B1 | 12/2001 | Tyroler et al. .......... 132/112 |
| 6,405,403 B1 | 6/2002 | McKay .................. 15/228 |
| 6,493,899 B1 | 12/2002 | Hintz et al. |
| 6,502,585 B1 | 1/2003 | Mazzei et al. |
| 7,055,528 B2 * | 6/2006 | Shah et al. ............. 132/109 |
| 2003/0116171 A1 | 6/2003 | Loveless |
| 2003/0229958 A1 | 12/2003 | Thompson et al. |
| 2004/0181892 A1 | 9/2004 | Chen |

* cited by examiner

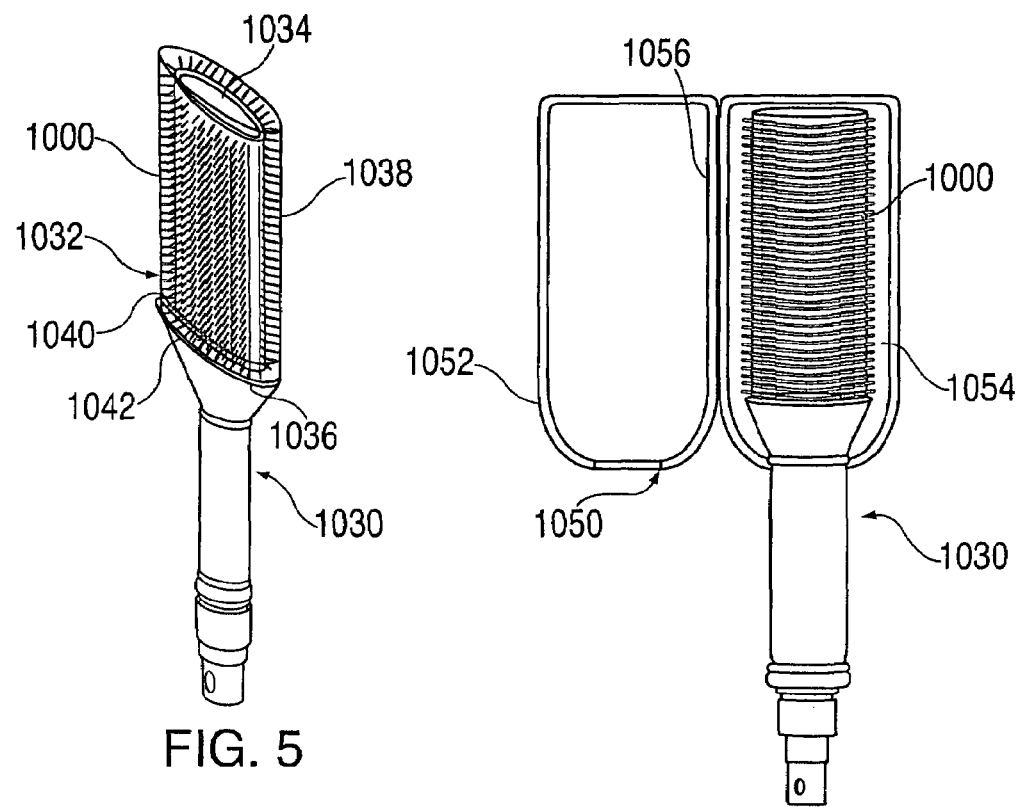
FIG. 5
FIG. 6
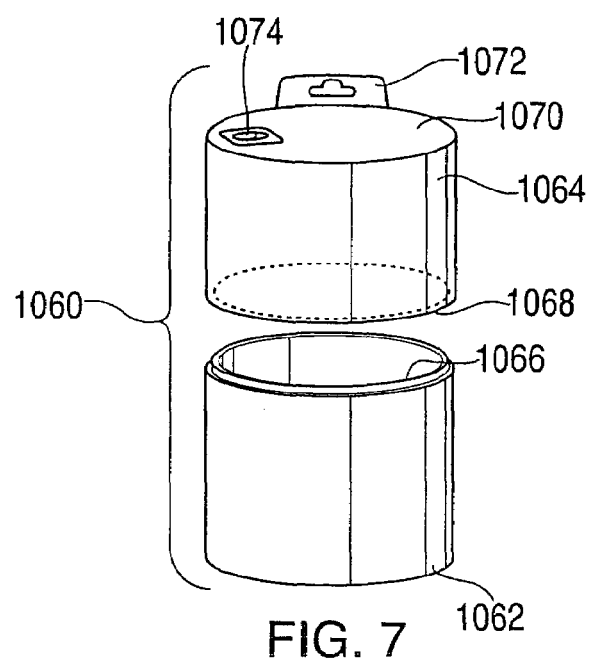
FIG. 7

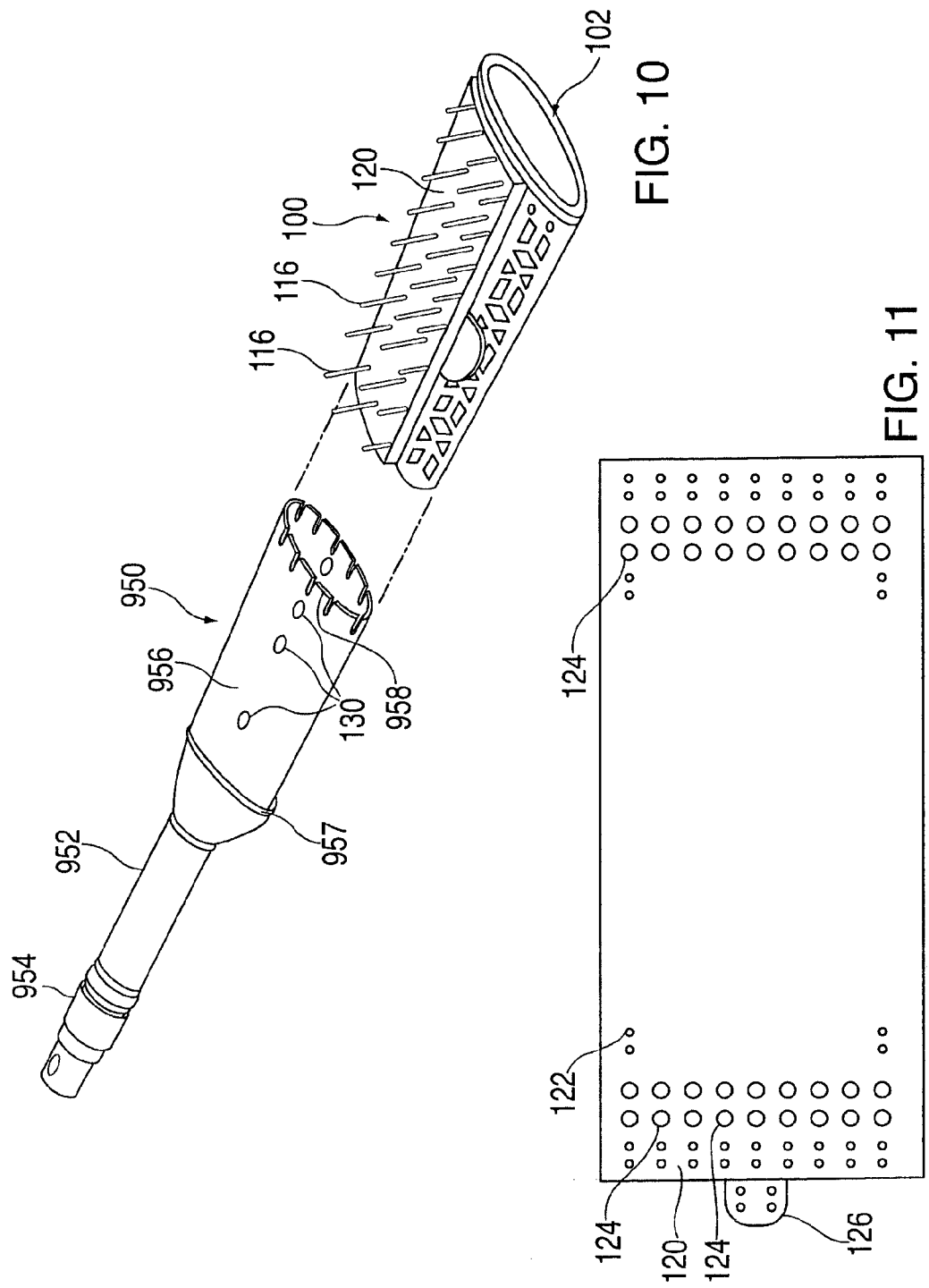

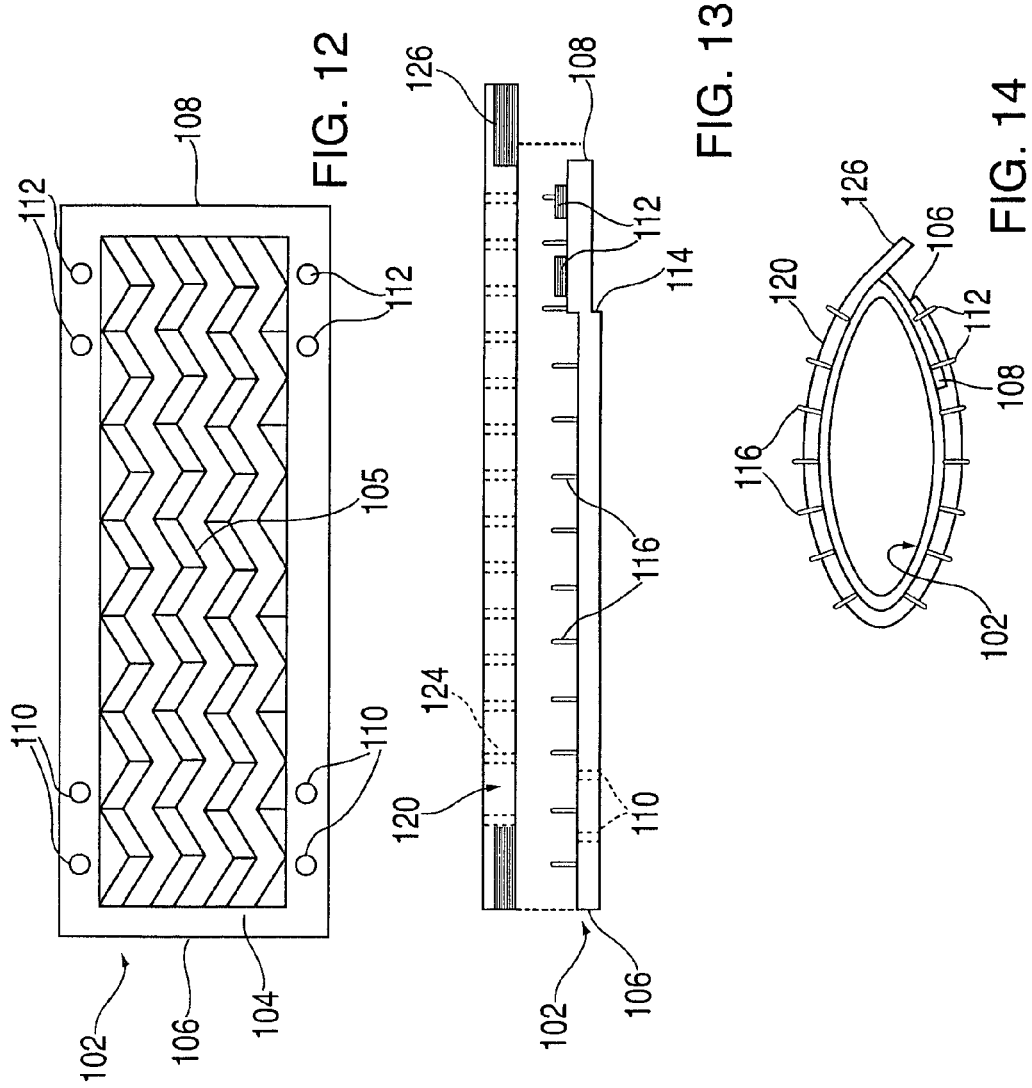

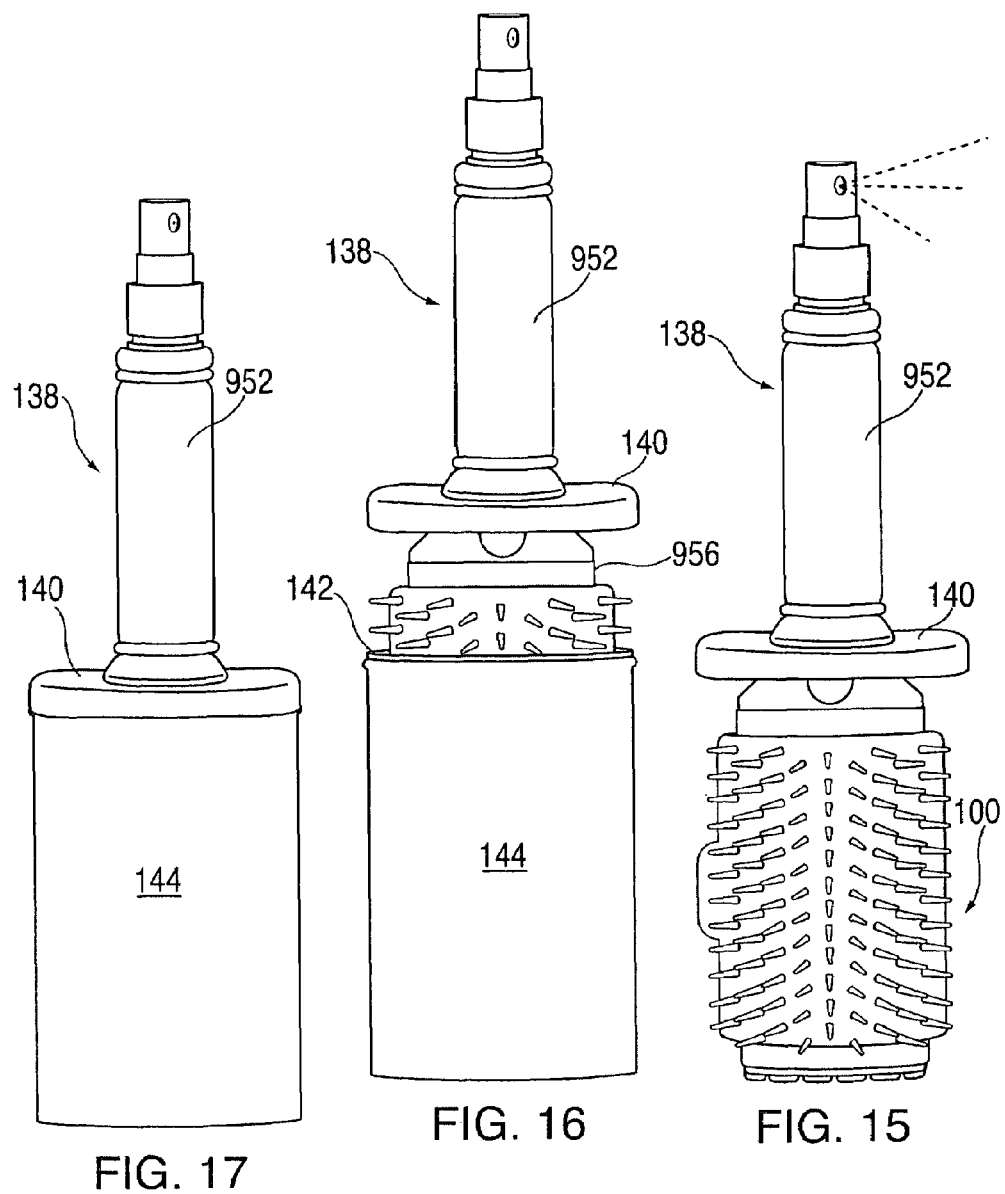

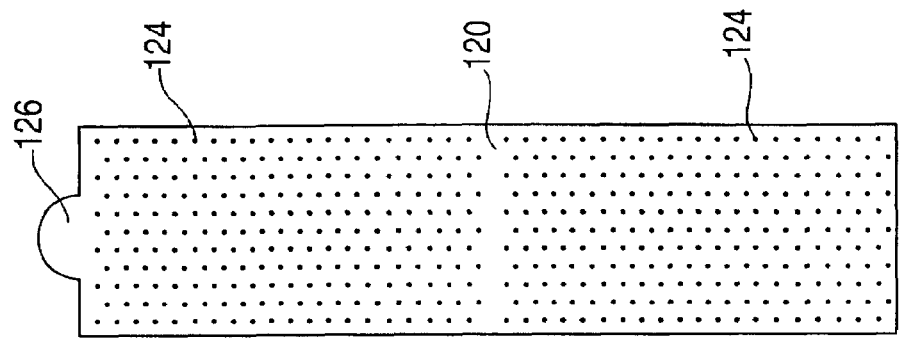
FIG. 41
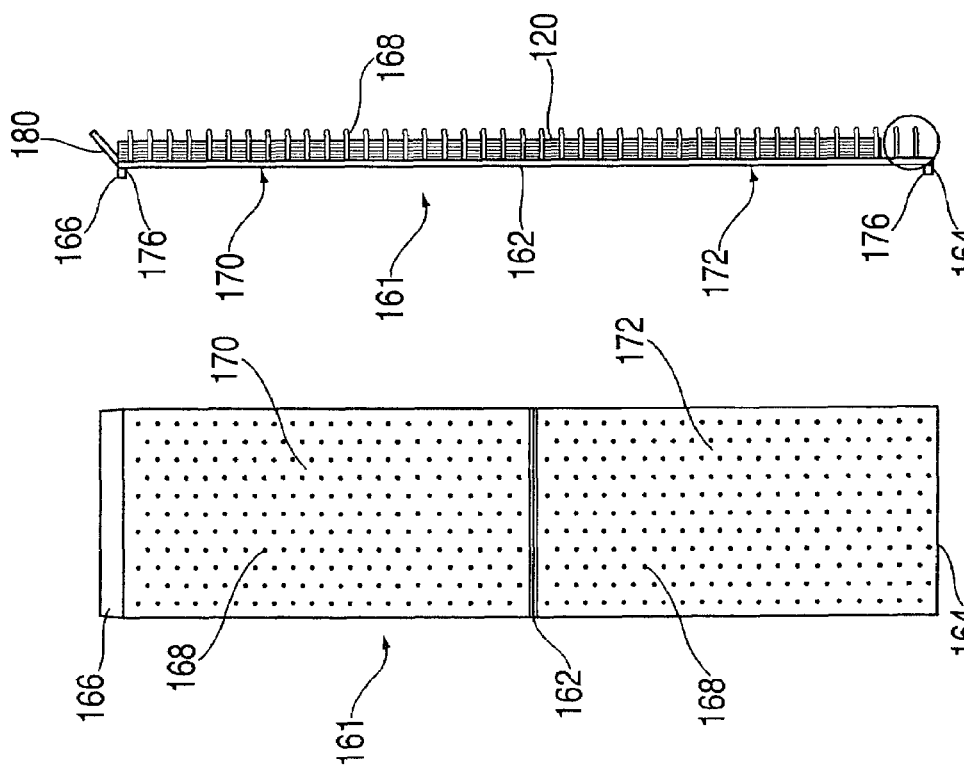
FIG. 40
FIG. 39

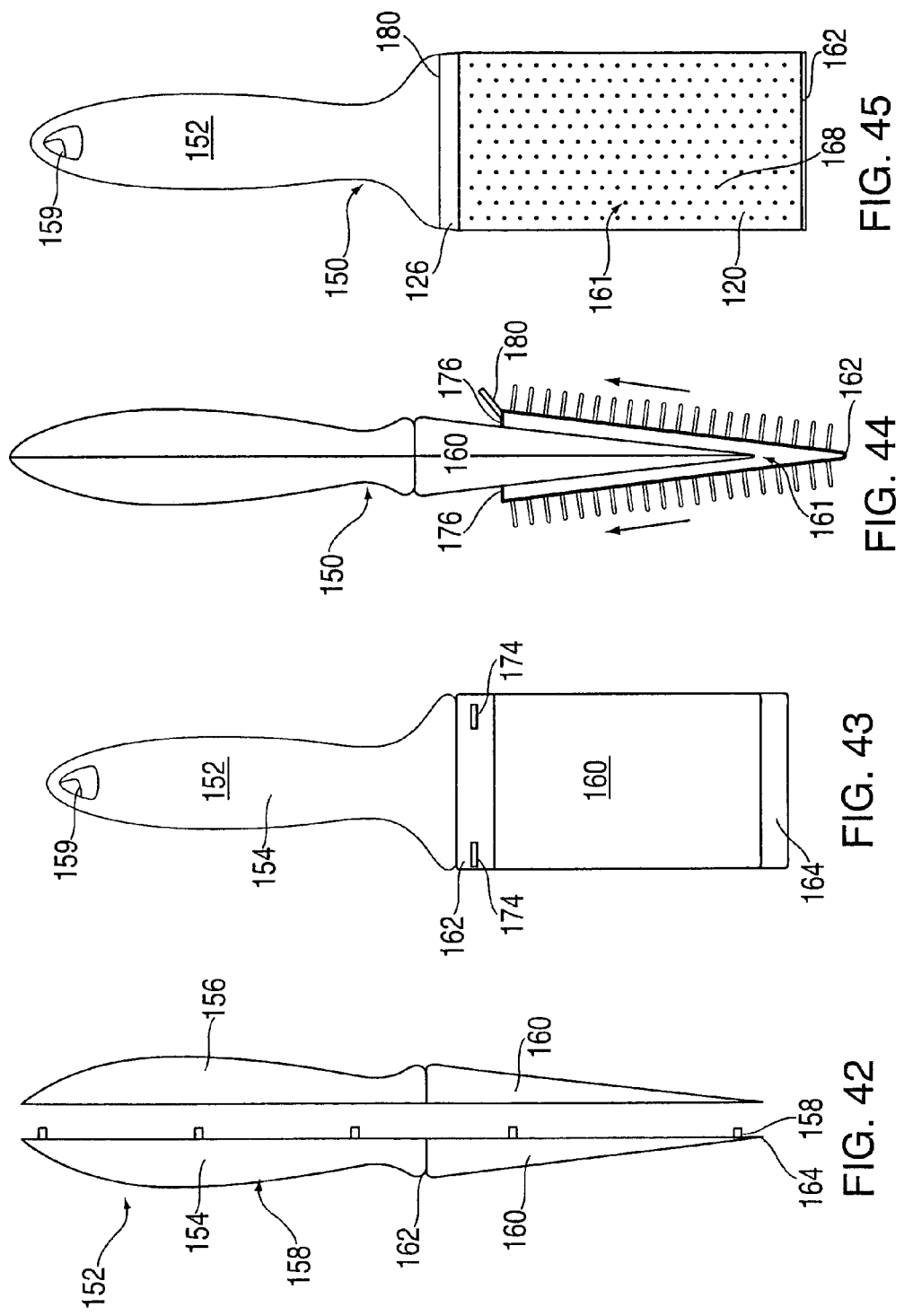

LIQUID DISPENSING BRUSH

CROSS REFERENCE TO CO-PENDING APPLICATIONS

This application is a continuation-in-part of co-pending application Ser. No. 10,851,503 filed May 21, 2004 and entitled "Grooming/Cleaning Apparatus" which is a continuation-in-part of co-pending application Ser. No. 10/717,956, filed Nov. 20, 2003, and entitled "Grooming/Cleaning Apparatus", which is a continuation-in-part of co-pending application Ser. No. 10/672,909 filed Sep. 26, 2003, and entitled "Lint Removal Apparatus with Edge Orientation", which is a continuation-in-part of U.S. Ser. No. 10/812,475 which is a continuation-in-part of co-pending application Ser. No. 10/614,551, which is a continuation-in-part of application Ser. No. 10/329,717, now U.S. Pat. No. 7,039,982 which is a continuation-in-part of application Ser. No. 10/302,038, now U.S. Pat. No. 6,763,977, which is a continuation-in-part of application Ser. No. 10/143,396, now U.S. Pat. No. 6,698,626, the contents of each of which are incorporated herein in their entirety.

BACKGROUND

Various hair care utensils have been devised for grooming, cleaning, treating, medicating, and otherwise taking care of human hair.

Brushes having a plurality of bristles are commonly employed for grooming hair. In addition, various sprays including manual pump sprays, pressurized aerosol containers, etc. are employed for applying hair coloring, hair treatment, cleaning solutions, etc., to hair.

However, brushes, while effectively grooming hair, do not remove significant quantities of liquid or other materials applied to the hair as the brush is moved through the hair. While dry shampoos have been devised which are applied to the hair, the ability of a brush to remove the dry shampoo, after coating the hair, is minimal.

It would be desirable to provide a brush which is capable of carrying a liquid and/or particulate spray dispenser as part of the brush as well as a peelable wipe which can be used to apply or remove hair treatments as the brush is drawn through the hair.

SUMMARY

In one aspect of the present invention, the cleaning apparatus includes a support with bristles extending therefrom and means for providing a dispensable medication carried with the support. A wipe in the form of a sheet or scrim may optionally be mounted over the bristles. The sheet may be a fabric sheet, such as a non-woven fabric, which is dry and fluid absorbent or pre-moistened with a cleaning, deodorizing, medicament or other cleaning or grooming solutions for application to human hair.

In another aspect, the cleaning apparatus is a brush including a handle and a support. A mat is mountable over the support and carries bristles.

The mat or substrate with or without the wipes, may also be provided as a refill or replacement cartridge for an existing cleaning apparatus including a support and/or handle. Thus, any of the inventive substrates, with or without the wipes, may be packaged and sold as a refill cartridge in a flat, extended state or with the substrate ends pre-joined. Likewise, the wipes may be pre-moistened with a cleaning or treatment medium or provided in a dry state, with the medium added by the user.

The present brush provides advantages over previously devised cleaning apparatus, especially cleaning or grooming apparatus devised for human hair. The present brush provides an effective means for cleaning hair separately or at the same time with the cleaning operation by applying a separate cleaning, deodorizing or medicament solution to the hair.

BRIEF DESCRIPTION OF THE DRAWING

The various features, advantages and other uses of the present invention will become more apparent by referring to the following detailed description and drawing in which:

FIG. 5 is a perspective view of a protective cap mountable over one of the present cleaning apparatus;

FIG. 6 is an elevational view of the protective cap of FIG. 5 shown in an open position;

FIGS. 7 and 8 depict another aspect of a protective enclosure which can be used to ship, display and use the present cleaning apparatus;

FIG. 10 is a exploded perspective view of another aspect of a cleaning apparatus;

FIG. 11 is plan view of a wipe mountable on the cleaning element shown in FIG. 10;

FIG. 12 is a plan view of a mat supporting the wipe as shown in FIG. 10;

FIG. 13 is an exploded, side elevational view showing the mounting of the stack of wipes on the mat of FIG. 12;

FIG. 14 is an end elevational view showing the use configuration of the mat and wipes of FIGS. 10-14;

FIG. 15 is a side elevational view of another aspect of a cleaning apparatus;

FIGS. 16 and 17 are side elevational view showing use of the cleaning apparatus shown in FIG. 15 with a fluid container;

FIG. 39 is a plan view of another aspect of a mat according to the present invention depicted in a pre-assembled, expanded flat state;

FIG. 40 is a side elevational view of the mat shown in FIG. 39 carrying a stack of wipes;

FIG. 41 is a plan, expanded view of one of the wipes shown in FIG. 40;

FIG. 42 is an exploded side elevational view of a two part handle and support according to another aspect of a cleaning apparatus;

FIG. 43 is a front elevational view of the handle and support of FIG. 42;

FIG. 44 is a partially exploded, side elevational view depicting the assembly of the mat and wipes on the handle and support of FIGS. 42 and 43;

FIG. 45 is a front elevational view of the assembled handle, support and wipes of FIGS. 39-44;

DETAILED DESCRIPTION

Figure 1:
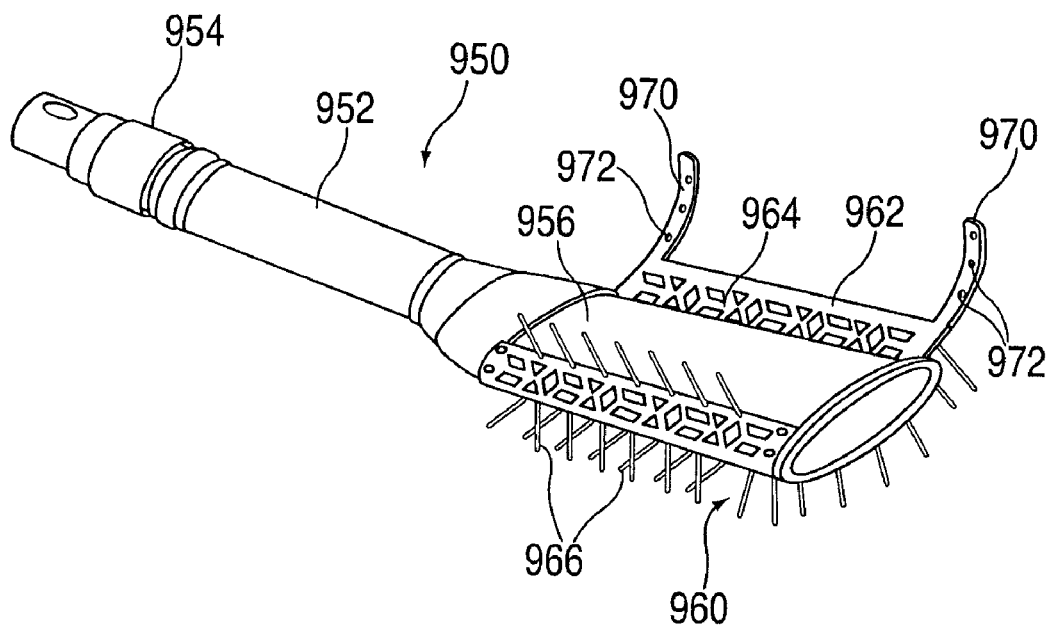
FIG. 1 is a perspective view showing one aspect of a cleaning element applied to a handle and support, with the cleaning element shown in a partially mounted position on the support.
Figure 2:
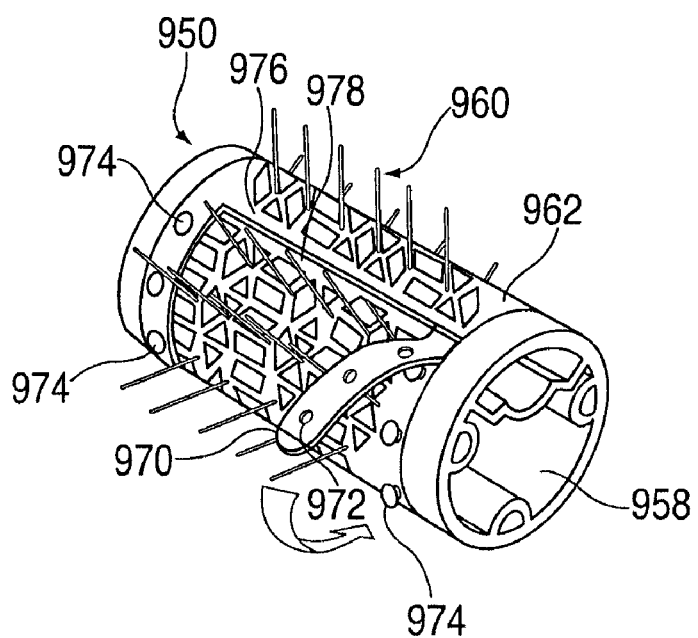
FIG. 2 is a perspective view of another aspect of a cleaning element.

Referring now to FIGS. 1 and 2, there is depicted one aspect of a cleaning apparatus brush 950. In this aspect, the brush 950 has a non-rotatable, generally unitary handle and support assembly including a handle 952 and a cleaning element support 956.

In the brush 950, the handle 952 is formed as a liquid dispensing means to allow the dispensing, such as in the form of a spray, of various cleaning, deodorizing, medicating, coloring, or other treatment fluids from the interior of the handle 952. By example, the handle 952 is in the form of a hollow member having an end 953. A dispensing assembly or cap 954 is mounted over the end 953 and is fixed or, more typically, removably mounted on the end 953 by threads, a hinge connection, etc. The dispenser means 954 includes a manually activated plunger which is capable of drawing liquid contained within the hollow hand 952 upwards along a conduit and out through a discharge nozzle.

A cleaning element 960 is formed, such as by molding, in an elongated, generally flat or planar shape. The cleaning element 960 includes a mat 962 of either solid or discontinuous shape which may have apertures 964 and angularly extending bristles 966. The bristles 966 may extend generally perpendicular from the mat 962 as shown in FIGS. 1 and 2.

The mat 962 is formed of a flexible plastic material so as to enable it to be disposed about a support 956 or 958 and removably secured in place for use.

In FIG. 1, since the support 956 on the cleaning apparatus 950 has a generally oval shape, the mat 962 will when mounted about the support 956 will conform to and assume an oval shape.

In FIG. 2, since the core or support 958 is depicted as circular in cross-section, the mat 960 will also assume a circular shape.

FIGS. 1 and 2 depict one means for securing the mat 962 to the core or support 956 or 958. The mat 962 includes at least one and preferably a pair of spaced straps 970 extending from one edge of the mat 962. The straps 970 include at least one and preferably a plurality of spaced apertures 972. The apertures 972 are adapted to snap over and engage generally mushroom shaped projections 974 extending from an edge portion of the mat. This secures the mat 962 about the support 956 or 958 with opposed edges 976 and 978 of the mat 962 juxtaposed or disposed in side-by-side registry. Alternately, the projections 974 could be formed in the straps and the apertures 972 formed in the mat.

It is also possible to form the apertures or projections directly in the core or support 956 or 958. In this arrangement, the corresponding or mating projections or elements are formed on the straps 970 of the mat 962 or in any portion of the mat 962 to allow easy and removable mounting of the mat 962 on the core support 956 or 958.

Figure 3:
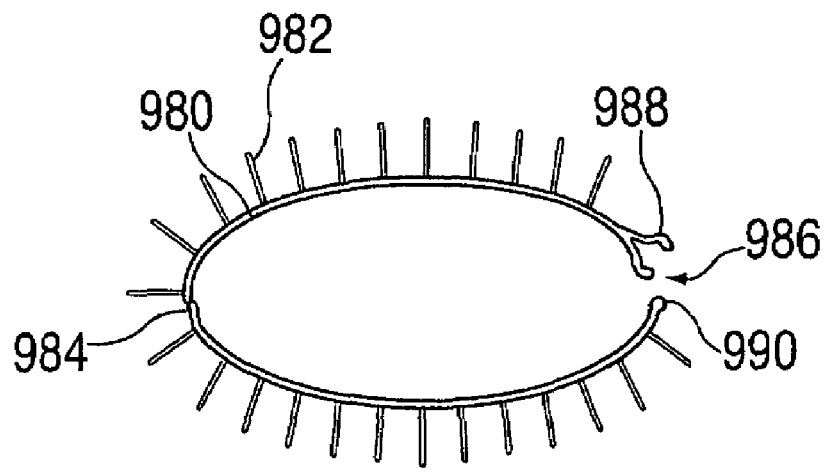
FIG. 3 is an end elevational view of another aspect of a lock means for the cleaning elements shown in FIGS. 1 and 2.

Another means for attaching a mat about a support is shown in FIG. 3. In this aspect of the invention, a mat 980 having a construction similar to the mat 974 has bristles 982 extending angularly therefrom. A reduced diameter portion or a living hinge 984 is formed longitudinally along one portion of the mat 980. The opposite free ends of the mat 980 are formed with a lock means 986 in the form of a receiver 988 and a projection 990 integrally carried on opposite free ends of the mat 980. The projection is releasably engagable in the receiver 988 to releasably secure the mat 980 about a support.

Figure 4:
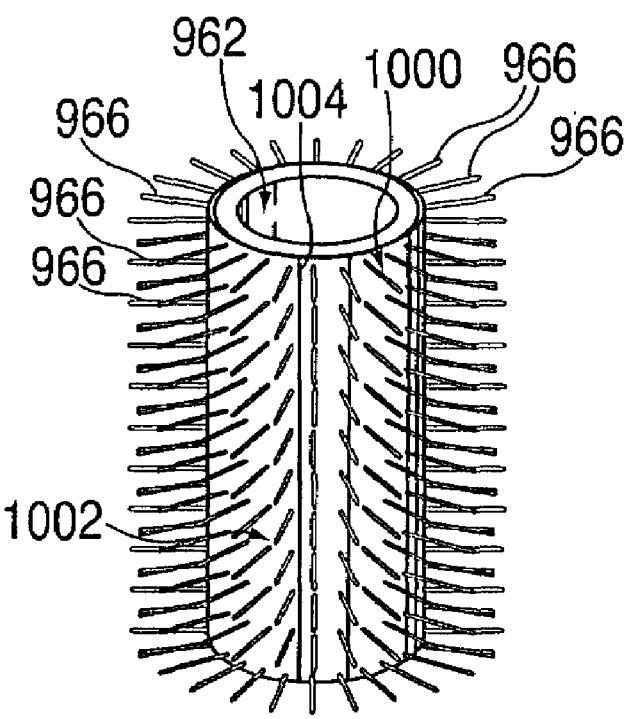
FIG. 4 is a perspective view of another aspect of a cleaning element using a pre-moistened wipe wrapped around bristles extending from a mat.

Referring now to FIG. 4, there is depicted yet another aspect in which any one of the cleaning elements described above which has protruding bristles extending from a mat or pad may also carry a wipe in the form of a fabric sheet in one or more stacked layers of either a separate sheet pad-like stack or wound in a continuous roll about the mat. The sheet, also referred to as a wipe 1000, may be any fabric sheet, such as a spunlace fabric of 20 gsm to 150 gsm non-woven material with 25 gsm to 100 gsm being a specific example.

The sheet or wipe 1000 may be applied in a dry state for cleaning, etc., or pre-moistened with any suitable cleaning, conditioning, deodorizing, freshening or medicament preparation or with a water activated, dry composition.

The wipes 1000 can have a waterproof backing or substrate. The substrate can be a thin film such as 0.25 mil-2.0 mil film. Polyethylene film can be used, by way for example, as the substrate.

In some applications, such as applying color to hair in a streak or an even form, the wipes 1000 may be formed with three-dimensional bumps of many different shapes, such as irregular or smooth shapes, i.e., a rounded shape, with spaces between each bump or surface irregularity of up to $\frac{1}{16}$ of an inch, for example. The spaces between the bumps or irregularities could also be void of material thereby taking the form of an apertured non-woven.

The aperture could optionally have a thin, non-absorbent membrane or substrate laminated to it. The substrate can be a thin film of 0.25 mil to about 2.0 mil which provides a dry area between the bumps on the non-woven material which would not transfer liquid or hair color.

This construction creates a wipe or applicator surface which transfers liquid unevenly to hair resulting in color streaks. The bumps or surface irregularities would carry more liquid than the non-woven material around them or, in the case of apertures between the bumps, the bumps would carry much more liquid than the apertured areas.

Figure 52:
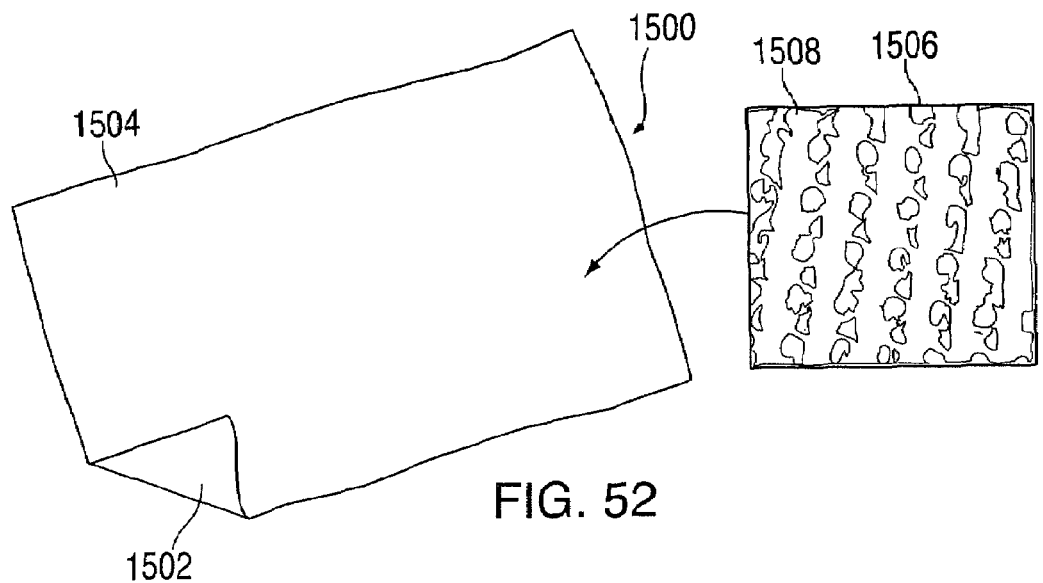
FIG. 52 is a perspective, partially exploded, enlarged view of one aspect of a wipe construction.
Figure 53:
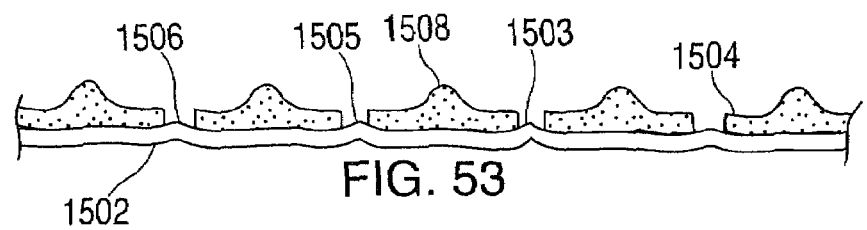
FIG. 53 is a cross-sectional view through the wipe of FIG. 52.

For example, FIGS. 52 and 53 show an alternative aspect of a wipe 1500 which has a non-slip polymer base layer 1502. For example, it may be a foamed or non-foamed PVC, thermo-plastic urethane, latex foam, or other suitable materials. The wipe 1500 also has an upper cleaning layer 1504 that is generally coextensive with the base layer and attached thereto. The cleaning layer 1504 is preferably formed of a non-woven and absorbent material. As best shown in the detailed blow-up portion of FIG. 52, the cleaning layer 1504 has a plurality of openings 1506 defined therethrough, such that exposed areas 1503 of the base layer 1502 are visible through the openings 1506. The openings 1506 are shown as generally circular, but may be any desired shape. For example, the openings 1506 can be shaped to depict a design motif or objects, such as clovers. Preferably, each exposed area 1503 includes at least one projection 1505 extending upwardly therefrom. Each projection 1505 extends though one of the respective openings 1506 to provide a non-slip effect on the upper surface of the wipe 1500. This arrangement is shown in the cross-section of FIG. 53. The cleaning layer 1504 preferably also has a plurality of upwardly extending nubs 1508 formed of the same non-woven material. The nubs 1508 may be hemispherical or rounded bumps, as well as other shapes. The combination of openings 1506 and nubs 1508 cause the wipe 1500 to have a three-dimensional upper surface. The exposed areas 150 of the base layer 1502 may be coated with an adhesive so as to retain debris thereon. In one aspect, the non-woven layer 1504 has a thickness between the openings of 0.008 to 0.020 inch with the nubs 1508 extending an additional 0.050 to 0.150 inches upwardly therefrom. The openings 1506 are preferably spaced apart and arranged in elongated rows, with each opening 1506 having a width and/or length of 0.050 to 0.300 inches. The nubs 1508 may have a width and/or length of 0.100 to 0.300 inches. The rows may be spaced apart 0.200 to 0.400 inches. As will be appreciated by one of skill in the art, these dimensions provide for a very large number of nubs 1508 and openings 1506 in a wipe size portion of non-woven material. Any of the dimensions discussed may be altered.

Figure 54:
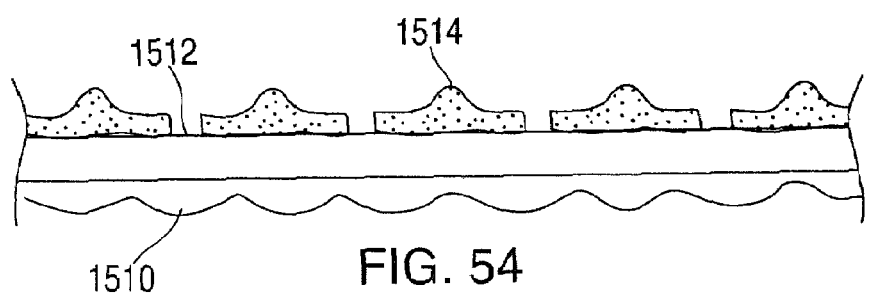
FIG. 54 is a cross-sectional of an alternate wipe.

FIG. 54 shows a cross-section of an alternative aspect having a non-slip base layer 1510, an absorbent middle layer 1512, and a non-woven top cleaning layer 1514. The non-woven cleaning layer 1514 is preferably configured similar to the layer in FIG. 52, but is joined to the absorbent middle layer instead of directly to the base layer 1510. Again, the exposed areas 1513 of the middle layer 1512 may be visible through the openings 1515 in the non-woven layer 1514. The exposed areas 1513 of the middle layer 1512 may be coated with an adhesive for retaining debris. Also, the non-woven layer 1514 may be joined to the middle layer 1512 continuously or non-continuously. If it is non-continuously joined, such as in a grid of inter-connected zones, a plurality of pockets are created with the openings 1554 in the cleaning layer 1514 providing access to each of the pockets. The debris may then be retained in these pockets.

Any of the other variations discussed in this application may also be applied to this version. For example, the base layer 1510 or middle layer 1512 may have a different color than the top cleaning layer 1514, so that the openings are more visible. The openings 1515 may also be provided in a pattern, so as to enhance its noticeability/the openings 1515 may also have different shapes. The middle layer 1512 may be a non-woven material, an absorbent material, and may include super-absorbing materials. The base layer 1510 on this or other embodiments may have an adhesive-coated or pattern-coated thereon to assist in gripping the brush or mat. Any of the layers may have a scrim reinforcement.

Figure 55:
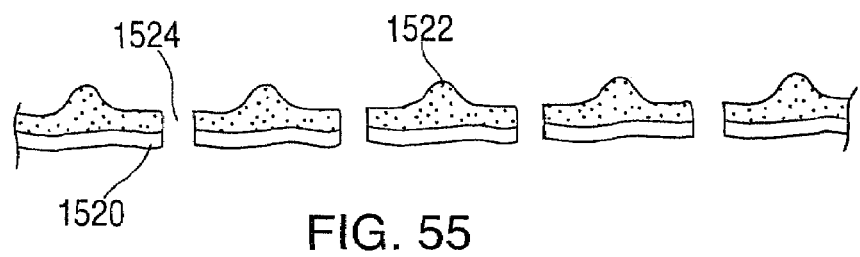
FIG. 55 is a cross-sectional view of yet another alternative wipe.

FIG. 55 shows yet another alternative wherein a base layer 1520 us joined to a non-woven cleaning layer 1522. Unlike the version of FIGS. 52 and 53, the base layer 1520 does not fill or cover the openings 1524 in the cleaning layer 1522. This, the openings 1524 extend through both the base 1520 and cleaning 1522 layers.

Due to the relatively loose fiber construction of the sheet or wipe 1000, the sheet or wipe may be forced under pressure over the bristles 966 in such a manner that the bristles 966 pierce and extend through the sheet 1000. Alternately, pre-punching apertures could be placed in the sheets 1000 arranged in the bristle pattern. After the desired wipe layer buildup is provided a smaller portion of the overall length of the bristles 966 will still extend outward from the outermost sheet 1000. The outermost edge 1004 of the sheet 1000 will normally be retained on the mat 962 due to the extension of the bristles 966 through the sheet 1000 and/or the non-parallel orientation of adjoining bristles 966.

In the case of bristles 966 formed of a rubber or elastomeric material, as compared to the smoother plastic materials, the unique rubber or elastomeric composition of the bristles 966 uniquely combines with the wipe 1000 to provide an expedient means for collecting hair and other debris from as the bristles 966 are moved through hair and then removing the hair or debris collected by the bristles 966 from the entire mat upon removal of the outermost sheet of the wipe from the core or handle assembly. In addition, where the wipe 1000 is in a pre-moistened state or provided with a tackified or adhesive outer surface, any debris or hair collected by the bristles 966 is held in place by the wipe 1000. This provides a simple cleaning effort since any hair or debris removed as the bristles 966 are removed through the hair is collected and retained on the bristles 966 and/or the wipe 1000.

The bristles 966 when formed of rubber or other resilient elastomeric material, can also be employed to massage the scalp after a cleansing liquid is applied. The bristles 966, for example only, can be formed on one side of the brush 12 of rubber; while the bristles on the other side are formed of a firmer material, such as a firmer plastic, more suitable for combing and detangling or brushing hair. The two different material bristles can be molded in different material and snap together on a mat as described above.

The bristles 966, when formed of rubber or other elastomeric, may have a longer length than the more rigid plastic and more sparsely spaced than the firmer shorter plastic bristles which are more densely spaced to allow the rubber bristles to massage the scalp and loosen particles from the scalp and the plastic bristles with or without wipes, as described hereafter, used to spread hair cleaner or hair treatment evenly from the roots to the ends of each strand.

The bristles 966 may have the same length across the entire mat or brush, or may have different lengths. For example, the bristles along the edges of a ovaloid mat or brush. For example, the bristles 966 adjacent the side edges may be shorter in length to facilitate contact with any wipes disposed within the bristles and the user's hair and then longer bristles toward the center of the mat between the opposed side edges.

The bristle pattern, thickness and spacing, whether regular or irregular, can also be varied to accommodate different types of hair, thin, thick, coarse, fine, as well as long or short.

It is also possible to form the mat or brush with areas, such as lengthwise extending strips, which are void of any bristles. This ensures better contact between the user's hair.

If the brush 12 is formed with all plastic bristles, the ends of certain bristles can be coated or dipped in a vinyl or liquid rubber solution to create a soft scrubbing end. Alternately, if rubber bristles are used, the bristles can be molded with a texture or small bumps on their end to create a rougher scrubbing surface to disengage oils from the scalp with the assistance with the cleaning/cleansing solution that is sprayed onto the scalp.

The mat 962, which has been formed in a circular or ovalid shape with the ends locked together, can be applied over the cleaning apparatus. The mat 962 can also be formed in a flat shape and locked around an ovalid or semi-ovalid shaped handle.

In use, the cleaning element 1002 is urged over the surface to be cleaned. The bristles detangle the hair and the outermost surface of the wipe or sheet 1000 cleans or applies a conditioning, cleaning, deodorizing, freshening, medicament, etc., fluid to the hair.

When the outermost sheet 1000 is soiled, the edge 1004 or an integral tab, not shown, extending from the edge 1004 is grabbed and pulled from the mat 962. This separates the outermost sheet 1000 from the bristles 966 until a fresh sheet 1000 is exposed. It should be noted that the act of removing the outermost sheet 1000 also pulls any hair or debris which may have been dislodged by the bristles 966 from the hair away from the mat 962.

Continued grooming and subsequent removal of additional sheets 1000 from the mat 962 will expose more and more of the length of the bristles 966. This causes a deeper penetration of the bristles into the hair for a deeper grooming or massaging effect as well as a more thorough cleaning of the hair or the application of conditioning fluid to the hair.

It will also be noted that a sheet, similar to sheet 1000, may be provided with the length to be applied in one or more separate stacked layers on the mat 980 shown in FIG. 3, with one end of the sheet extending from the receiver 988 to the opposite end disposed adjacent to the projection 990.

The various bristles or projections on the cleaning elements described above as well as the one piece handle and cleaning element support described above can be simply embodied in a one piece brush having a handle portion extending from a unitary cleaning element support from which a plurality of bristles are integrally formed or otherwise fixedly mounted on the support.

A sheet constructed as described above can be wound one or more times around at least a portion and preferably the entire circumference of the bristles. Depending upon the looseness of the fabric, the bristles can pierce and extend through the sheet. Alternately, as described above, apertures may be formed in the sheet to allow for passage of the bristles therethrough.

In this aspect, once the sheet or wound roll of sheets has been completely used, the entire brush can be discarded.

Referring now to FIGS. 5 and 6, there is depicted two aspects of protective cap or enclosure which can be used to surround a cleaning element of the present invention such as a pre-moistened sheet 1000 wound around the support section of the cleaning apparatus 1030.

In the aspect shown in FIG. 5, the protect cap or closure 1032 is formed as a cylinder having an ovalid or circular cross section with a closed end 1034 and an opposed open end 1036. A sidewall 1038 extends between the ends 1034 and 1036.

The inside diameter of the cap 1032 is sized to easily slide over the sheet 1000 and any bristles extending through the sheet 1000. The end 1040 of the cap 1032 adjacent the open end 1036 is sized to form a friction or pressure fit with a collar 1042 formed on the cleaning apparatus 1030 between a handle and the cleaning element support portions of the cleaning apparatus 1030. In this manner, the cap 1032 may be sealingly attached to the collar 1042 to sealingly enclose and prevent evaporation of the pre-applied fluid on the sheet 1000.

Another aspect of the a protective cap 1050 is depicted in FIG. 6. In this aspect, the protective cap 1050 include first and second complementary sections 1052 an 1054 which are hingedly connected, such as by a living hinge 1056 integrally formed between the sections 1052 and 1054.

The sections 1052 and 1054 have an ovalid or circular cross section so as to snugly enclose the sheet 1000 and any bristles extending through the sheet 1000 to sealing encompass the sheet 1000 and prevent evaporation of any fluid pre-applied to the sheet 1000.

Suitable lock means, not shown, may be carried on the sections 1052 and 1054 to enable the sections 1052 and 1054 to engage in a snap connection forming a seal about mating peripheral edges of the sections 1052 and 1054.

Figure 8:
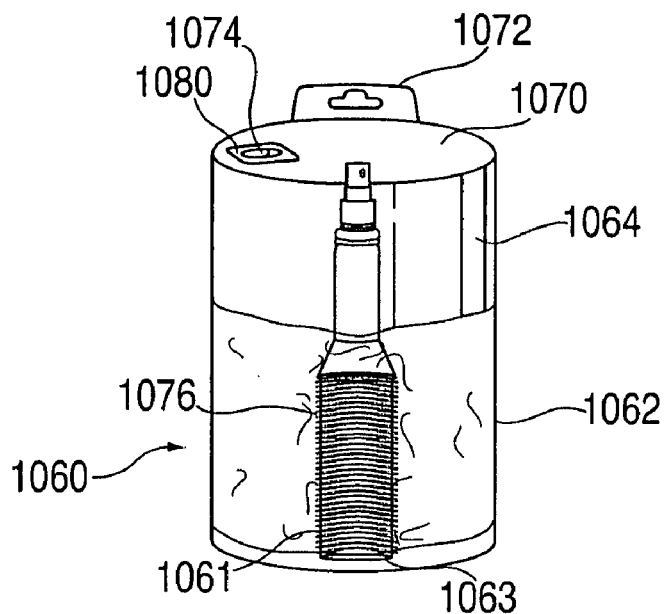

Referring now to FIGS. 7 and 8, there is depicted another container 1060 which may be used to store the cleaning element of the present invention during shipping from its initial manufacturing site to a final assembly site wherein the cleaning, deodorizing or medicament solution is added to the wipe, as well as providing a convenient container for sealingly enclosing the cleaning element between uses by the consumer while preventing evaporation of any fluid applied to the wipe on the cleaning element.

As shown in FIG. 7, the container 1060 includes, by example only, a two part container including a lower container 1062 and an upper container 1064 which are sealingly joinable by suitable means, including a pressure fit, a snap fit, sealing elements, threads, and combinations thereof.

The lower container 1062 is a closed ended container having an open top end 1066.

The upper container 1064 also has an open end 1068 adapted to fluidically communicate with the open end 1066 of the lower container 1062. The opposite end 1070 of the upper container 1064 is closed. A hanger 1072 may optionally be formed or mounted on the closed end 1070 of the upper container 1064 for ease of handling, mounting during display in a store, etc.

An aperture 1074 is formed in the upper container 1064 in either a side wall container or, optionally, in the end 1070. The aperture 1074 provides an easy means for applying fluid 1076, in FIG. 8, into the interior of the container 1060.

A moisture proof, seal member 1080, such as a rubber stopper plastic threaded cap or an adhesive backed tape or label, is removably or permanently applied over the aperture 1074 after the fluid 1076 is poured into the container 1060.

In use, once the cleaning element 1061 having a wipe according to one of the aspects of the invention described above is assembled, it is placed within the lower container 1062. The upper container 1064 is then sealingly joined to the lower container 1062. It should be noted in this state, the wipes 1063 on the cleaning element 1061 are dry. The sealed container 1060 can then be shipped to a final assembly site. The sealable cover 1080 is removed exposing the aperture 1074. The desired solution, i.e., cleaning, deodorizing, medicament, etc., is then poured through the aperture 1062 into the interior of the container 1060 wherein it is absorbed by the wipe 1063. The cover 1080 is then sealingly applied over the aperture 1070 to seal the interior of the container 1060. Alternately, the container is shipped to plant without the seal 1080 and unclosed. It is then filled and the closing means installed.

Only enough liquid is poured through the aperture 1074 to be absorbed by the wipes 1063.

Once the now complete cleaning assembly has been purchased by a consumer, in order to use the cleaning apparatus 1061, the consumer separates the upper container 1064 from the lower container 1062 and removes the cleaning apparatus 1061. After use has been completed, the consumer reinserts the cleaning apparatus 1061 into the lower container 1062 and sealingly attaches the upper container 1064. This forms a closed environment for the cleaning element 1061 to prevent evaporation of the fluid applied to the wipe 1063.

Refill wipe cartridges, as described above, may be subsequently purchased by the consumer. The replacement cartridges can be removed from the sealable enclosure, such as a flexible, sealable pouch or container, and mounted on the cleaning apparatus 1061 as a replacement for a used cleaning element and wipe 1063. The refilled cleaning apparatus 1061 is then reinserted into the container 1060.

Figure 9:
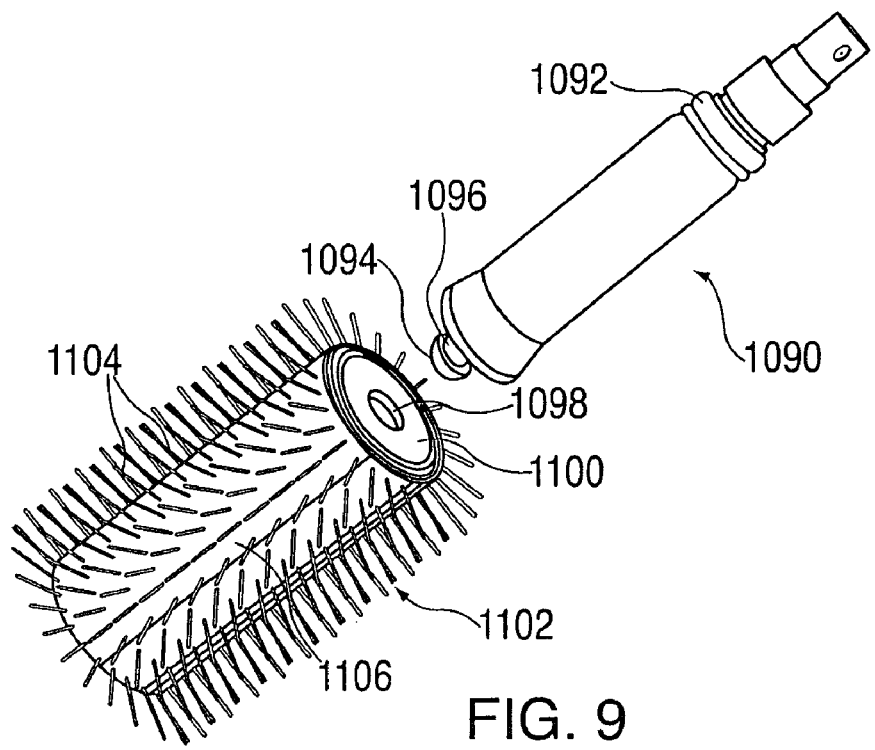
FIG. 9 is a perspective view of another aspect of cleaning apparatus.

Referring now to FIG. 9, there is depicted yet another aspect of a cleaning apparatus 1090 according to the present invention. In this aspect, the cleaning apparatus 1090 includes a handle 1092 of any suitable shape. The handle 1092 may be hollow or solid. One end of the handle 1092 is formed with one part of a locking means, such as a mushroom shaped, enlarged cap or head 1094. The head 1094 extends from a smaller diameter neck 1096 which integrally extends from one end of the handle 1092. The head 1094 is adapted to snap into and lock through an aperture 1098 in an end wall 1100 of cleaning element denoted generally by reference number 1102. The end wall 1100 may be a part of a generally tubular support or core having a circular or ovalid cross-section. The aperture 1098 has a slightly smaller diameter than the outer diameter of the head 1094 to allow the head 1094 to be deformably inserted through the aperture 1098 and then expand outward to its normal shape. This positions the neck 1096 in the aperture 1098.

The diameter of the aperture 1098 and the outer diameter of the neck 1096 may be complementarity sized for fixed or rotative movement between the handle 1092 and the cleaning element 1102.

By way of example only, the cleaning element 1102 is depicted as having a plurality of outwardly extending bristles or projections 1104 and a cleaning sheet 1106, such as a non-woven fabric, as described above. The sheet 1106 may be provided in a single layer or in a plurality of layers about at least a portion and preferably the entire periphery of the core 1100. The sheet 1106, when wound into a plurality of turns about the core 1100, may be provided with separable individual sheets, as described above.

Referring now to FIGS. 10-14, there is disclosed the cleaning apparatus 950, described above and shown in FIGS. 1 and 2, which has a modified cleaning element 100. In this aspect, the cleaning apparatus 950 includes the handle 952, the end cap 954, and the cleaning element support 956. A shoulder 957 is formed between a transition portion of the support 956 and the handle 952 and forms an edge for locating one end of the cleaning element 100 when the cleaning element 100 is mounted on the support 956. The opposite end of the support 956 is formed with a plurality of resilient fingers 958 which project radially outward from the plane of the support 956. The fingers 958 are bendable radially inward to allow sliding mounting of the cleaning element 100 over the support 956. Once the outermost end of the cleaning element 100 passes the fingers 958, the fingers 958 snap back to their original position to retain the cleaning element 100 on the support 956.

The cleaning element 100 includes a substrate mat 102 formed of a flexible plastic material. This enables the mat 102 to be bent or conformed to the shape of the support 956 which is depicted in FIGS. 10 and 14 as being oval, by example only. Other shapes, such as circular, may also be employed for the support 956. As shown in FIGS. 12 and 13, the mat 102 is initially molded in a flat or planar configuration. Although the mat 102 may have a solid structure, by example only and for reduced material usage, and reduced weight, the mat 102 is formed with a solid peripheral boarder 104 extending between a first end 106 and an opposed second end 108. Apertures 110 and projections 112 are formed in the peripheral edge 104 of the mat 102 adjacent the first and second ends 106 and 108, respectively. Any number of apertures 110 and projections 112 may be employed. As shown in FIGS. 13 and 14, the second end 108 of the mat 102 has a notch or offset portion 114 which allows overlap of the opposed first end 106 when the mat 102 is bent to the shape of the support 956. For example, the first end 106 when formed to seat in the offset portion 114, provides a constant diameter inner surface in the mat 102 for conforming the mat 102, when in the shape shown in FIGS. 10 and 14, on the support 956.

By example only, the outermost end 106 of the mat 102 is preferably located at one of the sides or apexes of the oval shape, folded mat 102 shown in FIG. 14.

The interior of the mat 102 within the peripheral edge 104 is, by example only, formed with a lattice network 105 of short length segments for structural integrity.

In use, the mat 102 is initially formed in the generally planar shape shown in FIG. 13. A plurality of outwardly extending projections or bristles 116 are integrally formed on the mat, both in the peripheral edge 104 and at intersection points of the segments in the lattice network 105. The bristles 116 provide a grooming action when the cleaning apparatus is moved through hair.

Although the mat 102 may be used by itself for pet grooming purposes, an enhanced cleaning action as well as the ability to apply medication, grooming or cleaning solutions, etc., may be achieved by providing one or more sheets or wipes 120 arranged in a separable stack as shown in FIGS. 11 and 13. Each wipe 120 of a fabric sheet, such as a spunlace fabric of 20 gsm to 150 gsm non-woven material is in the form of a fabric or paper sheet which may be dry or pre-moistened with a cleaning composition, such as a cleaning fluid, medication for medication, deodorizing compositions, etc.

The fabric or cleaning wipe 120 is water insoluble. This means that the fabric does not dissolve in or readily break apart upon immersion in water.

Suitable materials for forming the wipe 120 include non-woven substrates, woven substrates, natural or synthetic sponges, polymeric nets or meshes, etc.

In one aspect, the wipe 120 is formed of a non-woven substrate in which one or more layers are formed of fibers which are not woven into a fabric, but are formed into a sheet, mat or layer. The fibers can be randomly aligned or oriented in primarily one direction. The non-woven substrate can also be formed of a combination of layers of random and directionally oriented fibers or small plastic or rubber flakes.

The non-woven wipe 120 can be formed of a variety of materials. Natural materials include silk fibers, cellulose fibers, wool fibers, camel hair fibers and the like. Cellulose fibers include fiber selected from wood pulp, cotton, hemp, jute, flax, in mixtures thereof Synthetic materials which can be used to form a non-woven wipe include any fiber selected from the group consisting of acetate, acrylic, cellulose, ester, polyamide, polyester, polyolefin, polyvinyl alcohol, polyurethane foam, in mixtures thereof Further, the water insoluble substrates used to form the wipe 120 may also be formed of two or more layers, each having different capabilities. The different capabilities can result from the use of different combinations of materials or from the use of different manufacturing processes or a combination thereof Alternately, the wipe 120 may be formed of a fabric sheet such as a spun lace. The wipe 120 may be applied in a dry state for cleaning, etc., or pre-moistened with any suitable cleaning, conditioning, deodorizing, or medicament preparation or with a water activated dry composition.

The wipes 120 may also be provided in a continuous wound roll about the mat 102 with perforations or other separation means formed between individual sheets to enable the outermost sheet to be peeled off of the roll when soiled in the same manner as lint rollers.

As shown by example only in FIG. 11, each sheet 120 has an overall shape approximate that of the mat 102. Small apertures 122 maybe formed throughout the loosely woven sheet 120. Although the bristles 116 may be forced through the loosely woven sheet 120, a plurality of larger diameter apertures 124 may be formed in each sheet 120 in a configuration matching the configuration of the bristles 116 on the mat 102. This enables each sheet 120 or a stack of like sheets 120 to be inserted over the bristles 116 as shown in FIG. 14, with the outer ends of the bristles 116 projecting outward beyond the topmost sheet 120.

Pull tabs 126 are formed at the end of each sheet 120 to allow for easy separation of a soiled or dirty outermost sheet 120 from the stack of sheets 120 on the mat 102. During this removal step, the outermost sheet 120 will also remove any hair entwined about the bristles 116 thereby presenting a clean sheet 120 and bristles 116 free of hair and other debris.

In use, the stack of a plurality of sheets 120 is mounted over the bristles 116 on a flat configured mat 102 as shown in FIG. 13. This loading step is simplified since the bristles 116 extend generally perpendicular from the mat 102 when the mat 102 is laid out in a flat configuration.

Next, the mat 102 and joined sheets 120 are folded or wrapped into a shape consistent with the shape of the support 956. By example only, the mat 102 is formed into an oval shape as shown in FIGS. 10 and 14. The apertures 110 are inserted over the projections 112 on opposite ends 106 and 108 of the mat 102 to lock the mat 102 in the oval shape. The entire cleaning element 100 formed of the sheets 120 mounted on the mat 102 is then forced over the fingers 958 on the support 956 as shown in FIG. 10. The cleaning apparatus 950 may then be used by pushing or pulling the cleaning element 100 through human hair.

It will also be understood that the above-described mat 102 in a flattened shape or in the pre-wrapped or folded oval shape shown by way of example in FIG. 14 with or without the wipes 120 may be sold as a refill cartridge for an existing handle and support 950.

The mat 102 may be sold as a refill cartridge itself in either a pre-wrapped or oval shape or the flattened shape which will then be formed by the consumer into the desired shapes complementary to the shape of the support 956. Alternately, the entire wrapped or bent mat 102 and a stack of wipes 120 may be sold as a complete unit. In this refill configuration, the wipes 120 may be provided in a dry state and subsequently subjected to a cleaning, deodorizing or medicament solution as describe hereafter. Alternately, all of the wipes 120 may be pre-moistened with the desired solution.

When the mat 102 is folded into the oval shape shown in FIG. 14, certain of the bristles 116 assume a non-perpendicular, angular position, with respect to the mat 102 and axis extending through the apexes of the oval shaped mat 102. This aids in holding the wipes 120 on the mat 102.

Referring back to FIG. 10, apertures 130 may be formed in the support 956 to allow dripping or oozing of cleaning fluid into the stack of sheets or wipes 120 carried on the mat 102 mounted on the support 156 when the hollow center portion of the support 156 is filed with liquid during the liquid filling stage of the production process.

Referring now to FIGS. 15-17, there is depicted a modification to the cleaning apparatus 950 in which the transition portion between the handle 952 and the support 956 is formed as a radially enlarged collar 140 having an open end and an interior recess within the collar 140.

The collar 140 is configured for mounting, via a snap-on, fluid-tight releasable mount on a recessed shoulder 142 of a container 144. The container 144 may be used to contain cleaning or medicament fluid for application to dry wipes 120 on the apparatus 130. The wipes 120 on the mat 102 mounted on the support 956 can be inserted into the interior of the container 144 shown in FIG. 16 until the collar 140 snaps over the shoulder 142. This seals the container and enables fluid within the container 144 to diffuse into the wipes 120. The apertures 130 formed in the support 956 allow for fluid passage from the interior of the hollow support 956, through the mat 102 and into the wipes 120.

The hollow interior of the handle 952 may extend completely through the support 956 or end at the transition between the handle 952 and the support 956.

Figure 18:
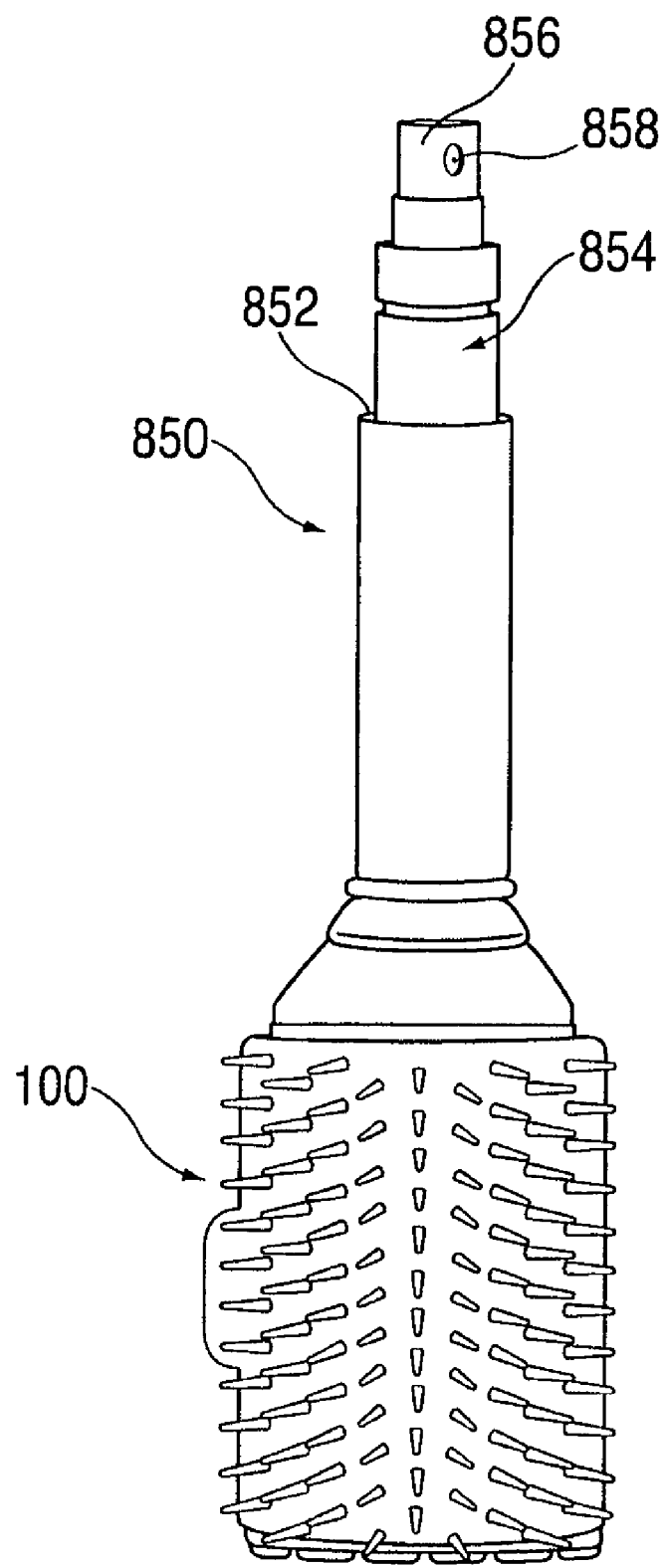
FIG. 18 is a side elevational view of another aspect of a cleaning apparatus with a replaceable container insert.

In another aspect shown in FIG. 18, the handle 850 is in the form of a hollow member having an open end 852. The end 852 allows a dispensing cartridge or container, such as an aerosol cartridge 854 to be removably inserted into the handle 850. The container 854 includes a depressable plunger or actuator 856 which allows the pressurized contents of the container or cartridge 854 to be dispensed through a discharge outlet 858. The container or cartridge 854 may be removed from the handle 850 when empty and a new, full container 854 remounted in the handle 850.

The container 854 may be held in the handle 850 by means of releasable interlocking projections and recesses within the interior of the handle 850 and the container 854 or through a tight friction fit between the container 854 and the handle 850.

Figure 19:
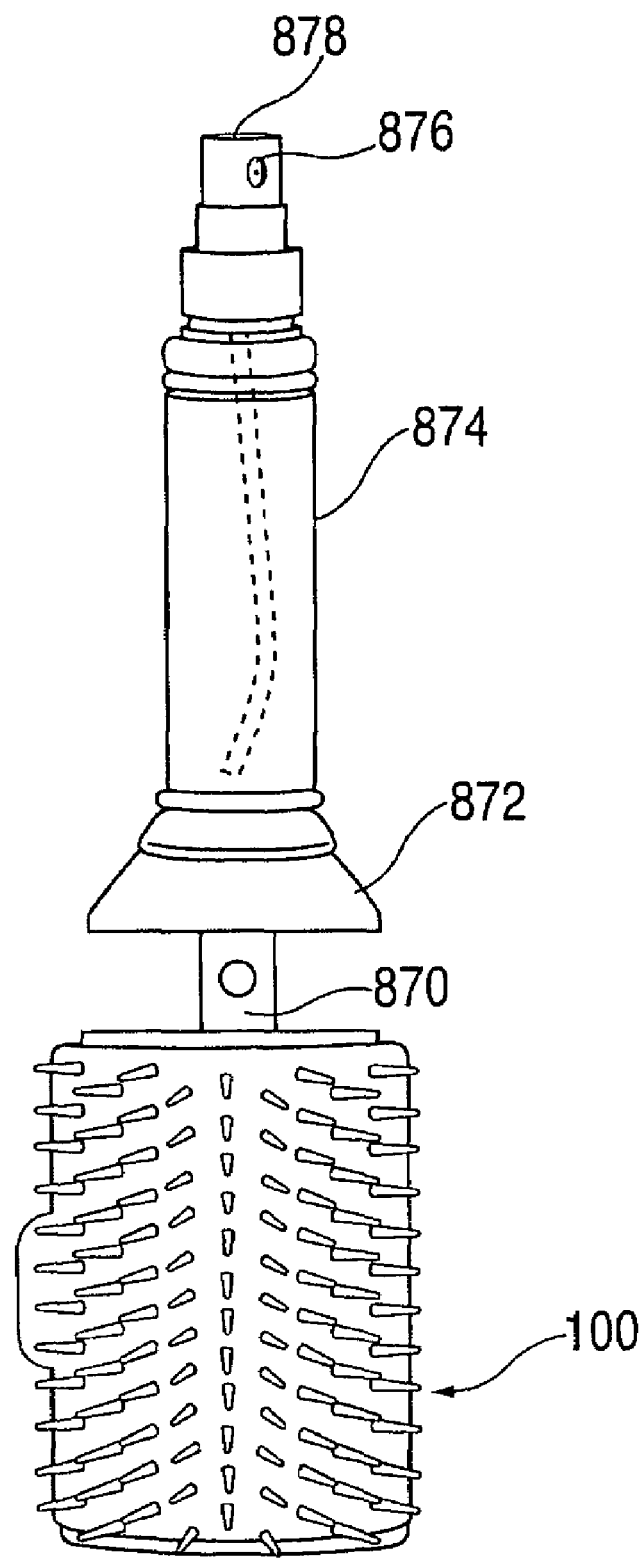
FIG. 19 is an exploded side elevational view of another aspect of a cleaning apparatus.

In another aspect, shown in FIG. 19, the mat and wipe cartridge 100 is fixed or releasably mounted on a support formed of an elongated rod 870. The rod projects from a conical hood 872 extending from one end of a handle assembly 874. In this aspect, the handle assembly 874 is similar to the handle 952 in that it forms an interior chamber for receiving a dischargable liquid from an outlet 876 on a depressable or movable actuator 878. The interior chamber capable of storing the dischargable liquid extends only through the handle 874.

The mat and wipe assembly 100 may also be in the form of a refill cartridge in which the mat and/or wipes can be provided as a closed or oval or circular member slidable over a support cage mountable on the rod 876. The mat may also be integrally formed as part of the cage. In this aspect, the cage would have an interior bore sized to slidably engage the rod 870 by friction fit or a snap on fit with interlocking projections or recesses in the rod 870 and the interior of the cage.

The support may be circular or oval. In addition, the non woven, peelable sheet wipes may be replaced with a single layer porous sponge-like material. The sponge may be employed to absorb liquids from the hair as the bristles are moved through the hair. Alternately, the sponge may be used to apply dry or liquid material to the hair.

Figure 20:
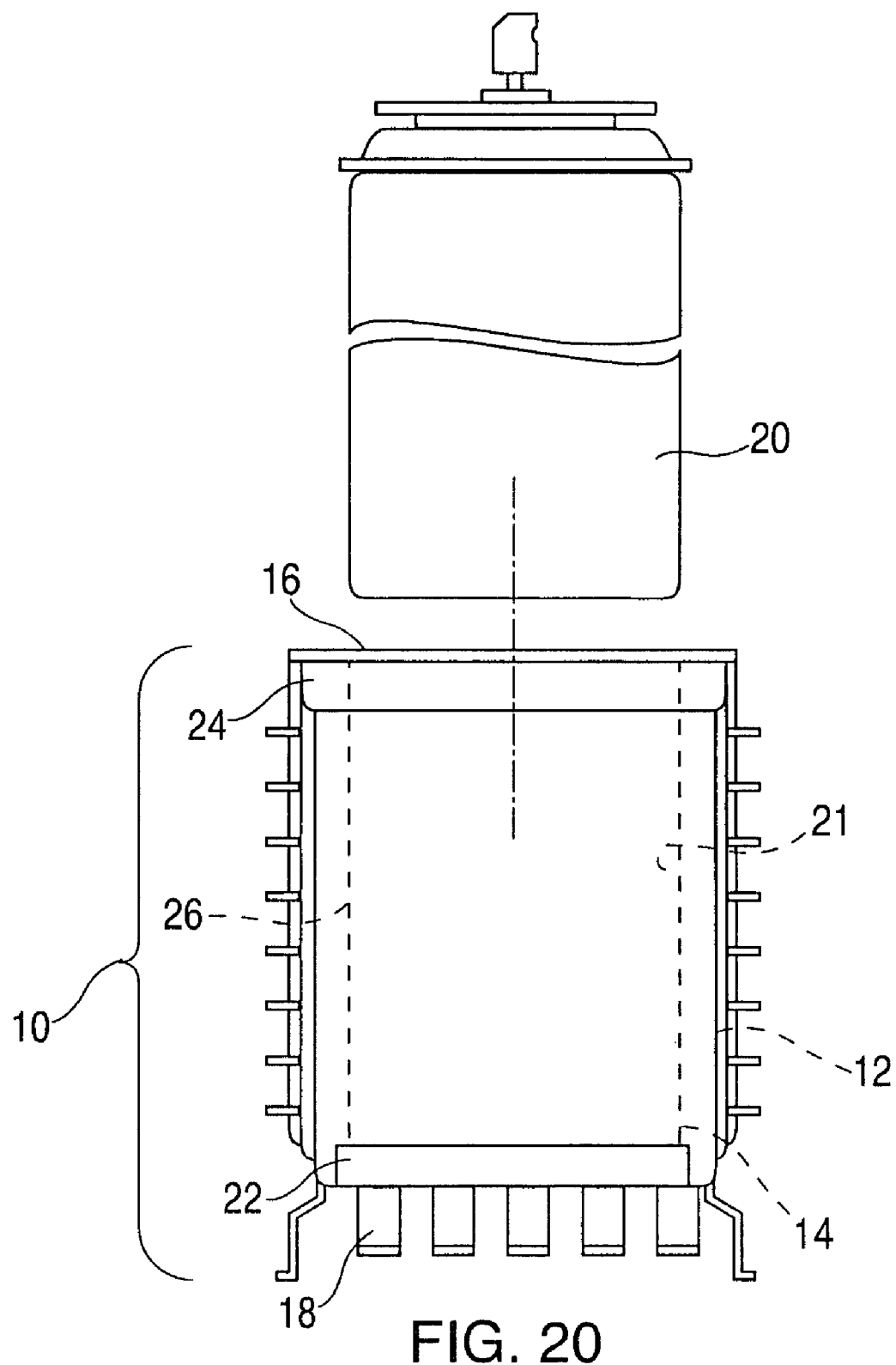
FIG. 20 is an exploded, side elevational view of another aspect of a cleaning apparatus.
Figure 21:
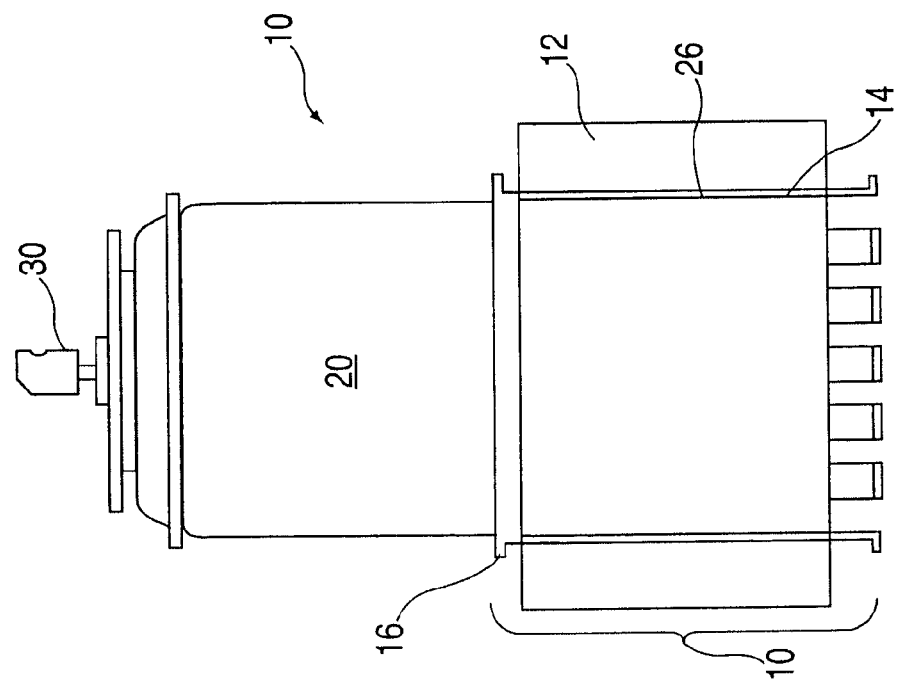
FIG. 21 is a side elevational view showing the cleaning assembled apparatus of FIG. 20.

Referring now to FIGS. 20 and 21, there is depicted a lint roller container assembly 10 constructed in accordance with the teachings of one aspect of the present invention.

A brush and/or brush end wipe assembly, hereafter referred to as a brush 12, may be any of the above-described mats with bristles and, optionally, with wipes. The brush 12 is mounted on a support 14 in the form of a plastic or other suitable material, cylindrically shaped tubular member having an enlarged flange 16 at one end and one or more projections 18 at a second end. The support 14 is hollow and has an inner diameter sized to snugly, but releasably received an aerosol or pump spray can 20 having a complementary outer diameter.

The support 14 is formed with first and second bearing surfaces 22 and 24, at opposite ends which rotatably support the brush 12. Further, a directional fabric 26 may be mounted between the bearing surfaces 22 and 24 on the cylindrical portion of the support 14.

As shown in FIG. 21, the can 20 is inserted into the hollow interior 21 of the support 14. The can 20 preferably has a length sufficient so that one end of the can projects outwardly from the flange 16 on the support 14 so as to function as a handle during use of the brush 12.

It can be seen in FIG. 21, that the spray nozzle 30 of the aerosol can 20 can be used independent of the brush 12.

Figure 22:
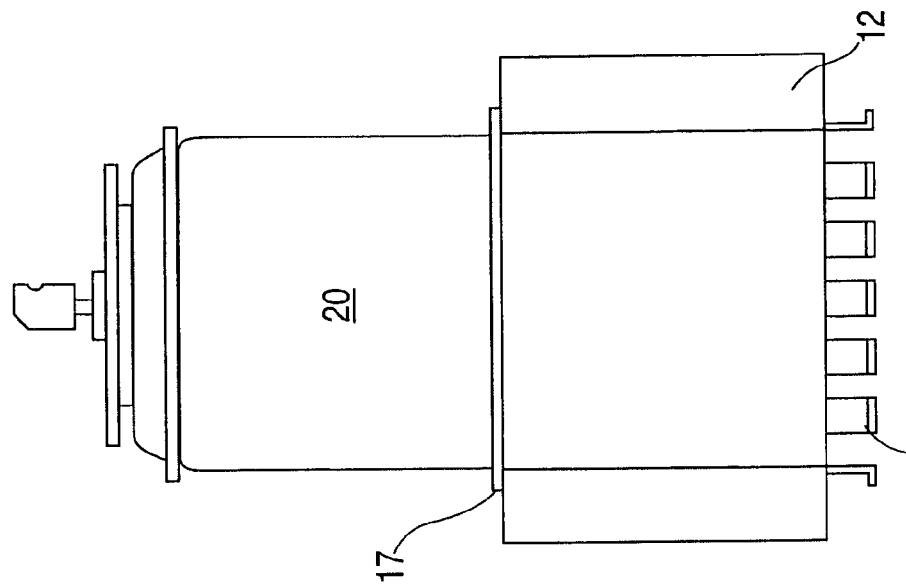
FIG. 22 is a side elevational view of a modified cleaning apparatus similar to FIGS. 20 and 21.

In a modification shown in FIG. 22, the directional fabric 26 is eliminated along with the first and second bearing surfaces 22 and 24. In this aspect of the invention, the brush 12 rotates about the outer surface of the can 20 between a first collar 17 and a second collar 19 which are mounted on or formed on the can 20. The collars 17 and 19 trap the brush 12 from axial movement.

Figure 23:
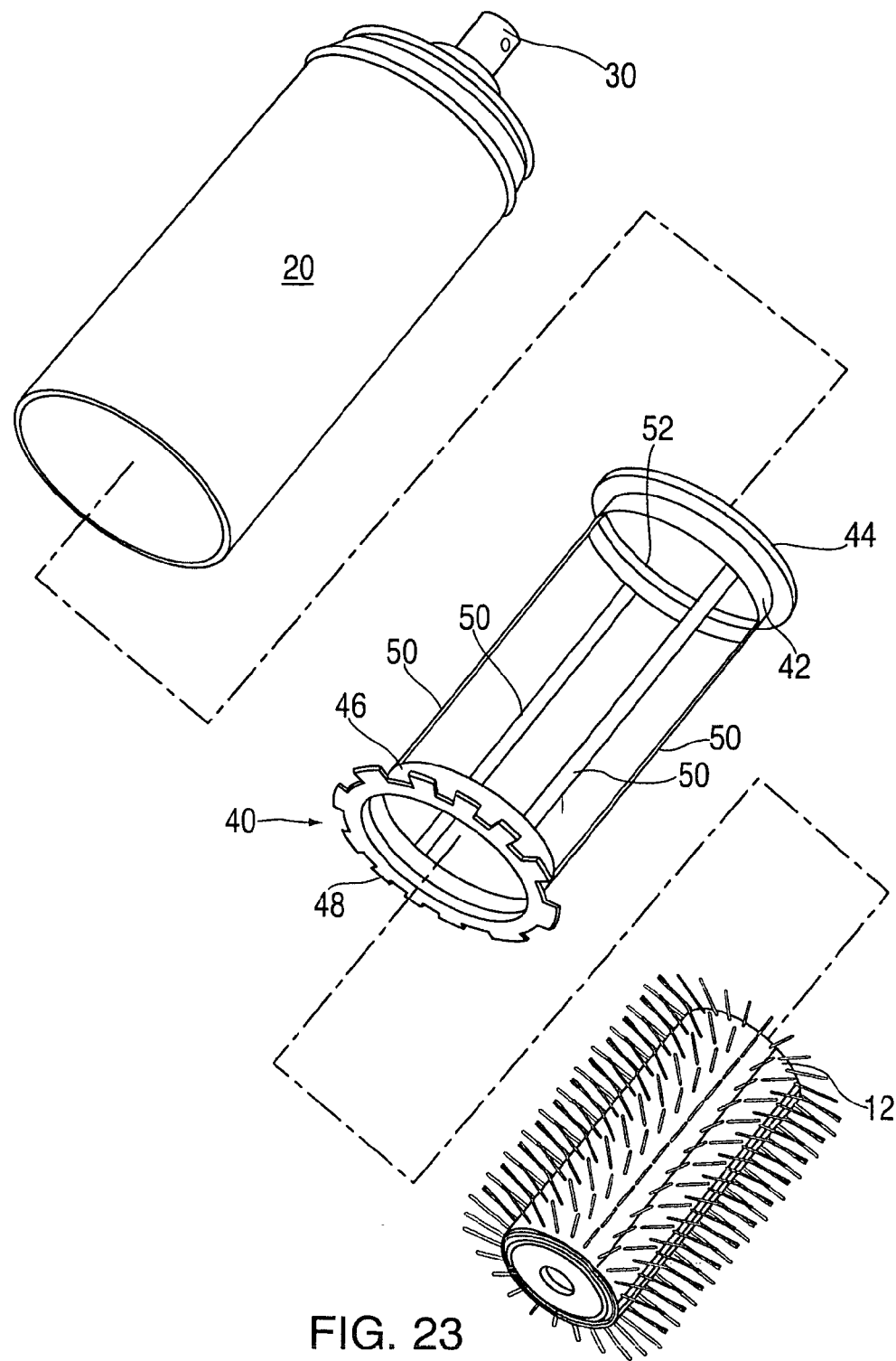
FIG. 23 is an exploded, perspective view of another aspect of a cleaning apparatus.

FIG. 23 depicts an alternate support 40 in the form of a cylindrical spindle. The support 40 includes a first collar 42 having an enlarged diameter flange 44 at one end. The opposite end of the support 40 defines a second collar 46 having a plurality of radially extending projections 48 extending therefrom. The collars 42 and 46 are rigidly interconnected by means of a plurality of slats 50.

The brush 12 is forced over the projections 48 and onto the first and second collars 42 and 46 wherein it is capable of rotation. The enlarged diameter end 44 and the projections 48 axially trap the brush 12 on the support 40.

An aperture 52 is formed in the flange 44 and is sized to snugly receive the outer diameter of the can 20. One end of the can 20 extends outwardly from the flange 44 after the can 20 has been fully inserted into the support 40, in much the same manner as shown in FIG. 21, to enable the exposed end of the can 20 to act as a handle for the brush 12.

Figure 24:
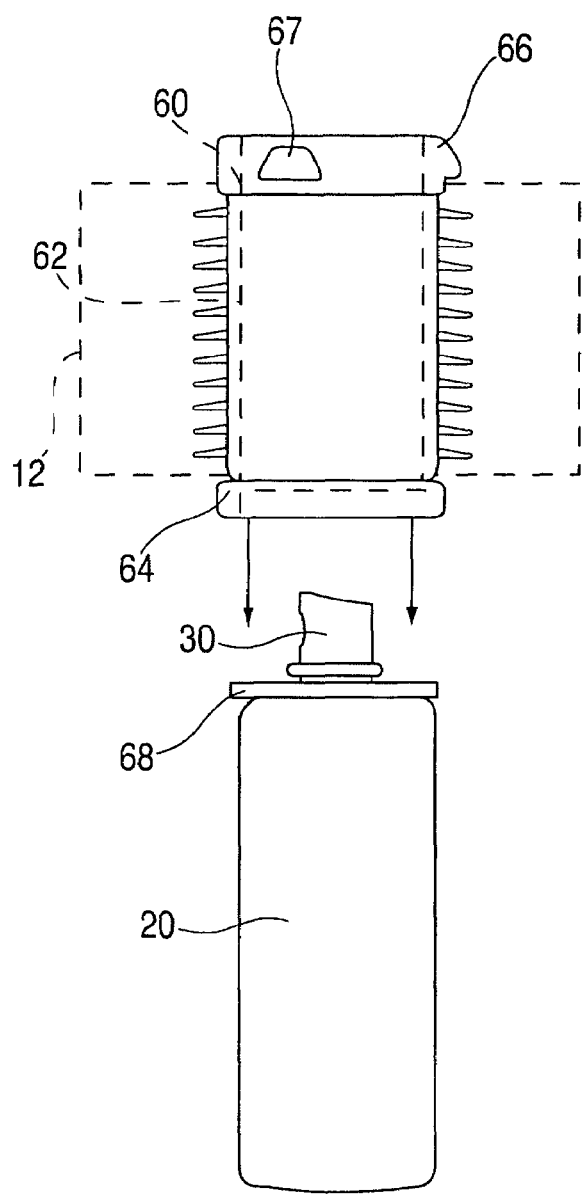
FIGS. 24 and 25 are exploded, side elevational views showing other aspects of the cleaning apparatus.
Figure 25:
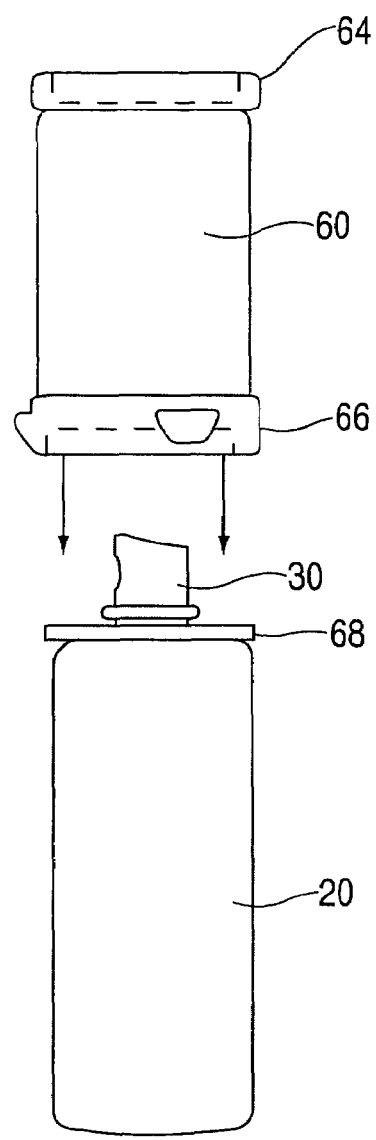

Referring now to FIGS. 24 and 25, there is depicted other aspects of the present invention in which the brush 12 is rotatably mounted on an can 20. As shown in FIG. 24, a brush support 60 is in the form of a hollow, cylindrical body formed of a suitable plastic for example only. The support 60 includes a bearing surface 62 located between two enlarged collars 64 and 66 formed at opposite ends of the support 60. The collars 64 and 66 axially trap the brush 12 therebetween for rotation of the brush 12 about the bearing surface 62 of the support 60.

The collar 64 has an open ended recess which is releasibly engagable via a snap-on fit with a flange 68 formed at one end of the aerosol can 20 immediately adjacent the nozzle 30. In this manner, the support 60 may be snapped onto the aerosol can 20 for use of the brush 12. When it is desired to dispense the contents of the can 20 through the nozzle 30, the support 60 is removed from the aerosol can 20.

In FIG. 25, the axial orientation of the support 60 is reversed from that shown in FIG. 24 in that the collar 66, which also has an open ended recess, is releasibly engaged with flange 68 on the aerosol can 20.

Figure 26:
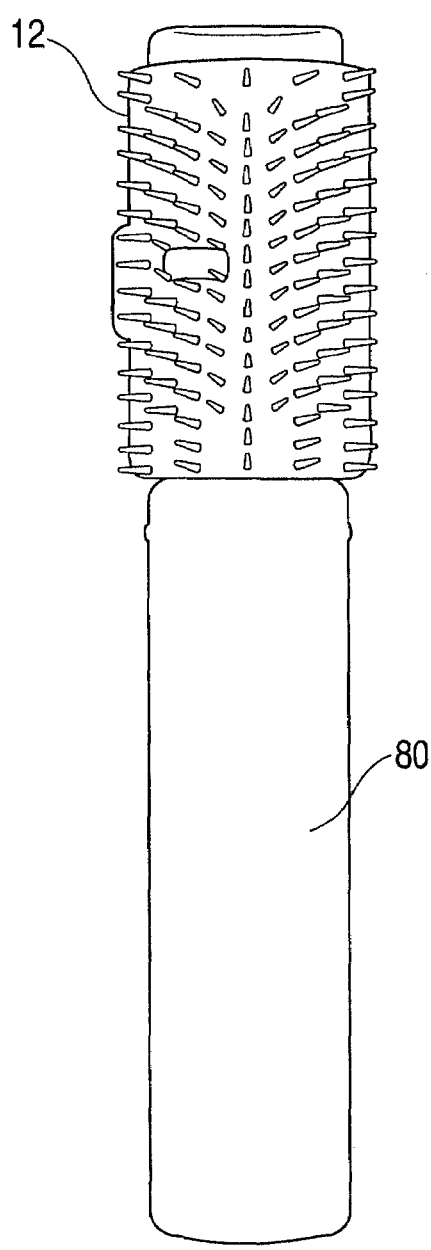
FIG. 26 is a side elevational view of another aspect of a cleaning apparatus in the form of a brush mounted on an aerosol container.
Figure 27:
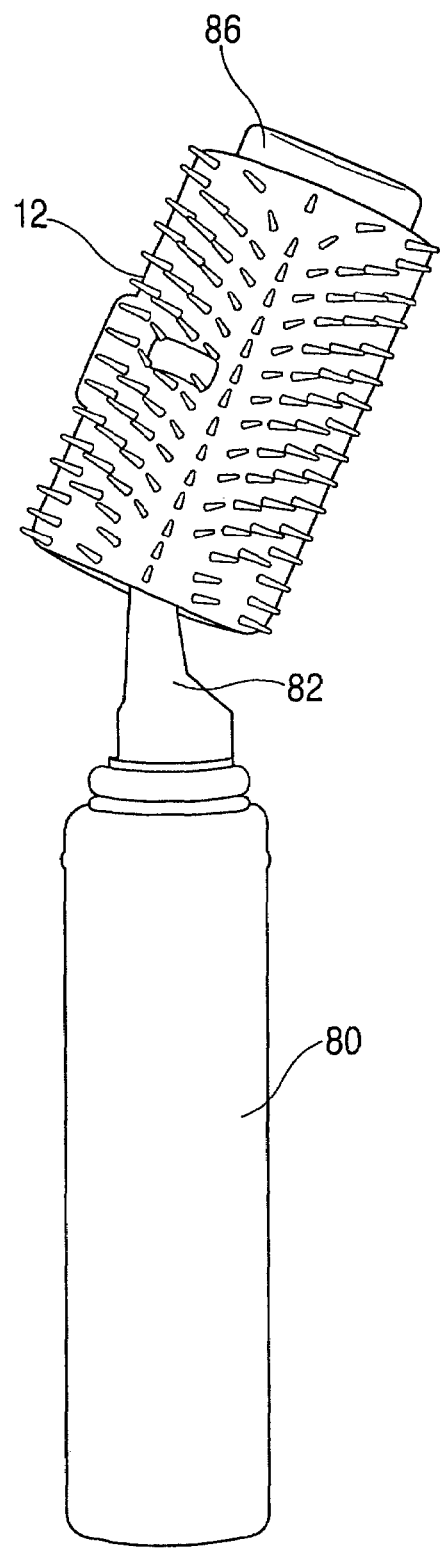
FIG. 27 is an exploded view of the brush and aerosol container shown in FIG. 26.

Referring now to FIGS. 26 and 27, an aerosol can 80 has an actuator, discharge end 82 formed of a movable actuator which is bendable or otherwise movable to allow the discharge of pressurized contents from the interior of the container 80.

The brush 12 includes an interior structure, such as a recess or bore, complementary to the shape of the actuator/discharge end 82 of the container 80 allowing the brush 12 to be removably mounted over the actuator/discharge end 82 in a snap-on or friction fit. The brush 12 is movable with the actuator 82 by sideways pressure on the brush 12. This allows the pressurized contents of the container 80 to be discharge through the interior of the brush 12 and out through an opening in the end 86 of the brush 12 for application to hair. Meanwhile, the brush 12 is useable as a brush, with the container 80 acting as a brush handle. The application of wipes to the brush 12 also enables the brush 12 to pick up debris or to apply other medicaments, coloring, cleaning solutions, etc. to the hair.

Figure 51:
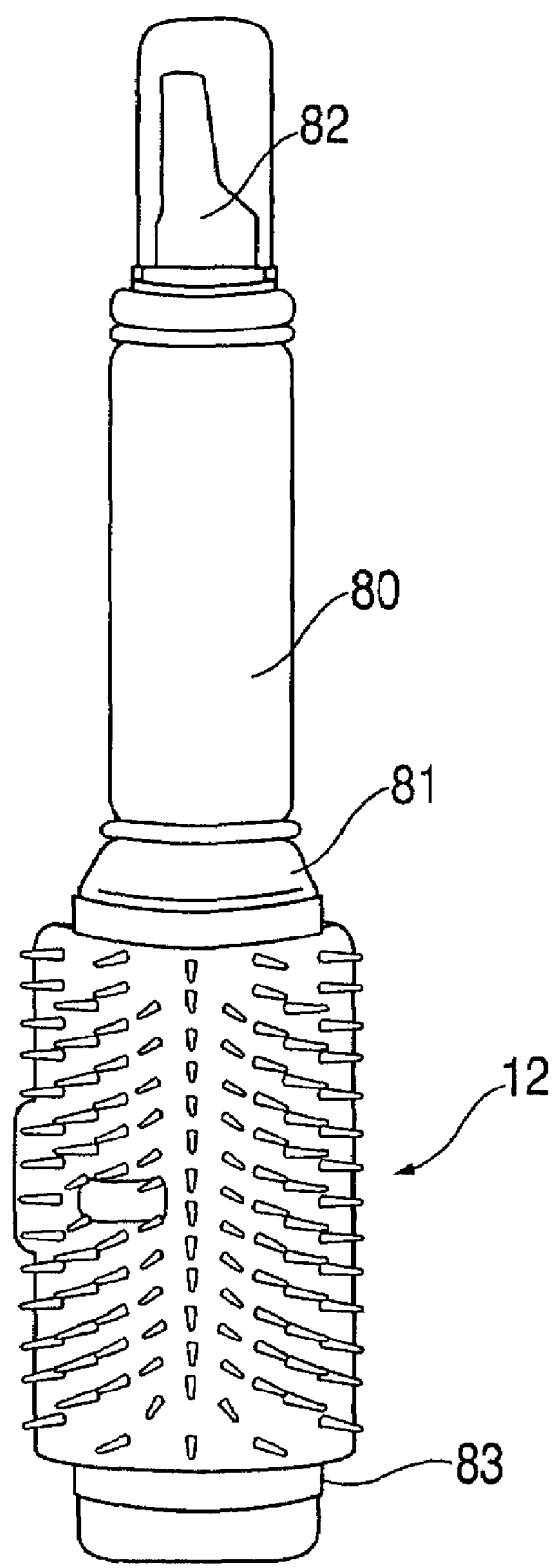
FIG. 51 is a side elevational view of an alternate cleaning apparatus.

Referring briefly to FIG. 51, there is depicted a modification to the cleaning apparatus shown in FIGS. 26 and 27. In FIG. 51, the can or container 80 has a collar or stop 81 integrally formed with or otherwise fixedly mounted on the container 80 intermediate the opposed ends of the container 80. The brush 12, as described above, is removably mounted as a replaceable cartridge over one end of the container 80 into engagement with the collar 81. An enlargement on the container 80 or a resilient ring 83 carried on the brush 12 may be employed to removably fix the brush 12 on the container 80.

Figure 28:
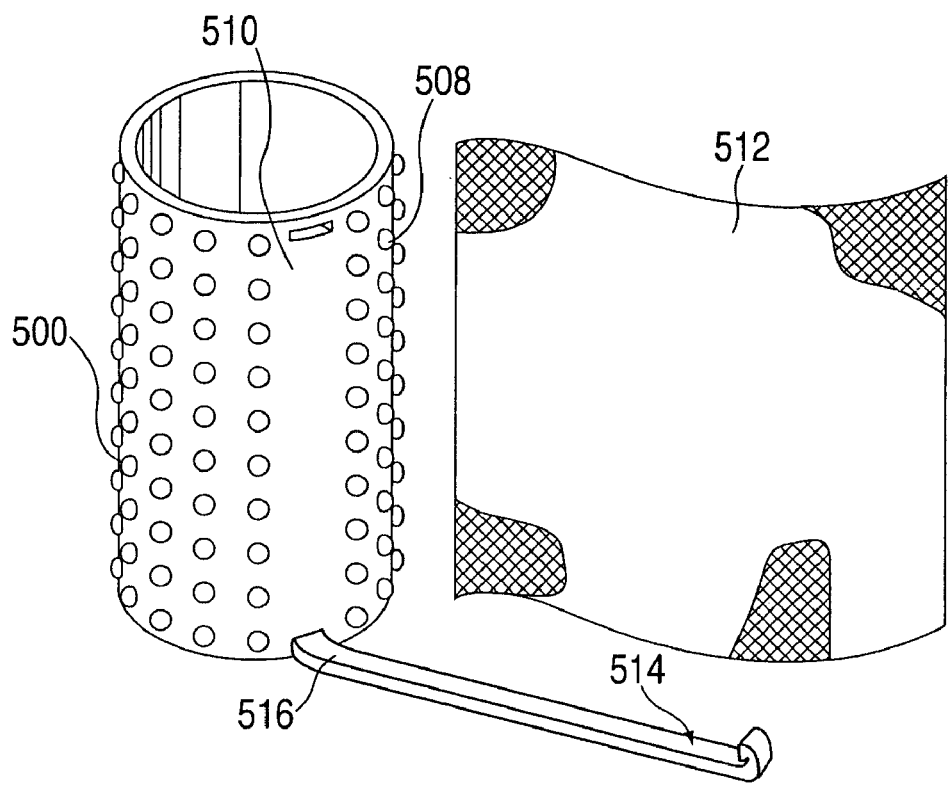
FIGS. 28 and 29 are exploded perspective views of other aspects of the cleaning element.

FIG. 28 depicts a modification to the cleaning element 500 in which the cleaning element 500 includes a space 510 which is at least partially void of the projections 508. A clamp, such as a hair barrette type clamp 514 is mounted on the mat and has a pivotal bar 516 which is extendable over a substantial portion of the width of the cleaning element 500. A wipe sheet 512 can be wound around the cleaning element 500 and the ends clamped in place by clamping of the pivotal bar 516 and the remainder of the clamp on the cleaning element 500. In this manner, the projections deform the sheet 512 and can be used to massage a pet while at the same time the wipe sheet 512 can be used to remove dirt, hair, dander, etc. The wipe sheet 512, preferably is a non-woven spunlace fabric, 20 gsm to 120 gsm pre-treated with cleanser, conditioner, shine enhancer, or medicament. The preparation is either activated by water by the user or pre-moistened and ready to use.

Figure 29:
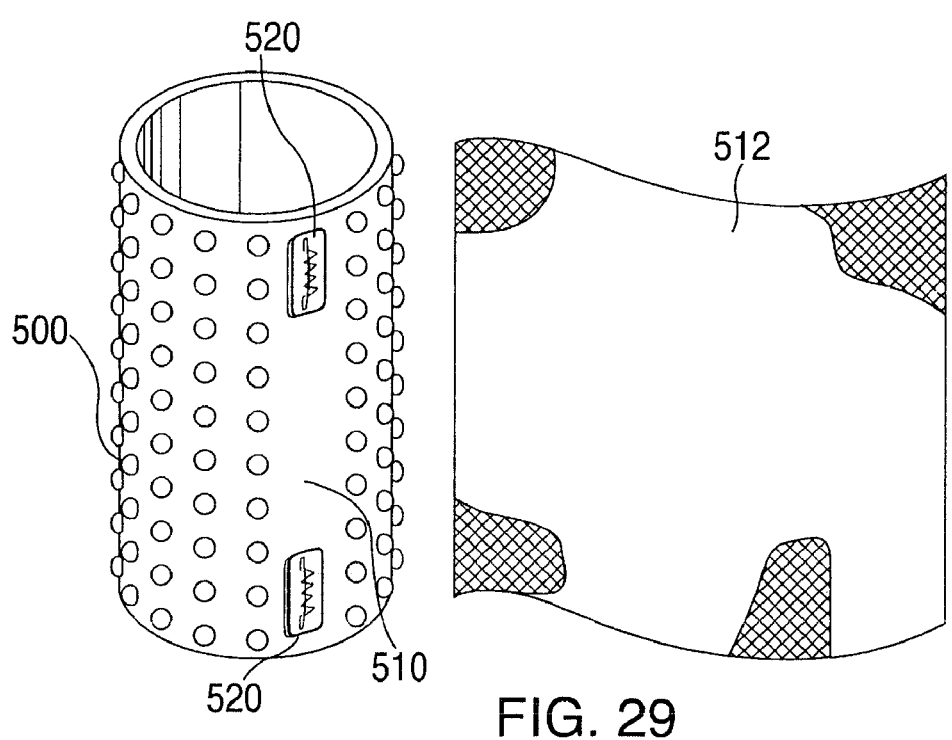

FIG. 29 depicts a similar modification to the cleaning element 500 in which the wipe sheet 512 is clamped on the exterior of the cleaning element 500 by at least one and preferably a plurality of expandable rubber grippers 520 mounted in the cleaning element 500.

The fabric or paper wipe may be dry or pre-moistened with a cleaning composition, such as a cleaning fluid, medication, deodorizing compositions, etc.

The fabric or cleaning wipe may be water insoluble. This means that the fabric does not dissolve in or readily break apart upon immersion in water.

Suitable materials for forming the wipe include non-woven substrates, woven substrates, natural or synthetic sponges, polymeric nets or meshes, etc.

In one aspect, the wipe is formed of a non-woven substrate in which one or more layers are formed of fibers which are not woven into a fabric, but are formed into a sheet, mat or layer. The fibers can be randomly aligned or oriented in primarily one direction. The non-woven substrate can also be formed of a combination of layers of random and directionally oriented fibers.

Non-woven wipe can be formed of a variety of materials. Natural materials include silk fibers, cellulose fibers, wool fibers, camel hair fibers and the like. Cellulose fibers include fiber selected from wood pulp, cotton, hemp, jute, flax, in mixtures thereof Synthetic materials which can be used to form a non-woven wipe include any fiber selected from the group consisting of acetate, acrylic, cellulose, ester, polyamide, polyester, polyolefin, polyvinyl alcohol, polyurethane foam, in mixtures thereof.

Further, the water insoluble substrates used to form the wipe may also be formed of two or more layers, each having different capabilities. The different capabilities can result from the use of different combinations of materials or from the use of different manufacturing processes or a combination thereof For example, the wipes can be wet for cleansing and dry for absorbing.

By way of example only, the wipe is formed of a plurality of pre-moistened wipe sheets wound in a roll defining a central opening or core.

Alternately, the roll of wipesheets may be coreless or wound around a hollow core plastic or paper, also having an internal bore sized to non-rotatably coupled to the spindle.

By way of example, each of the sheets of the wipe roll are separable from the remainder of the roll along a separation line defined by perforations, cuts, etc. The perforation typically extend all the way through the roll. A fastener, such as a staple, weld or mechanical bond, or adhesive is applied along the separable edge to maintain integrity of the wipe roll or pattern coated on the backside of the roll. A pull flap may also be provided at a discontinuous portion of the separable wipe to facilitate tearing off and removing of the outermost sheet from the remainder of the roll.

Figure 31:
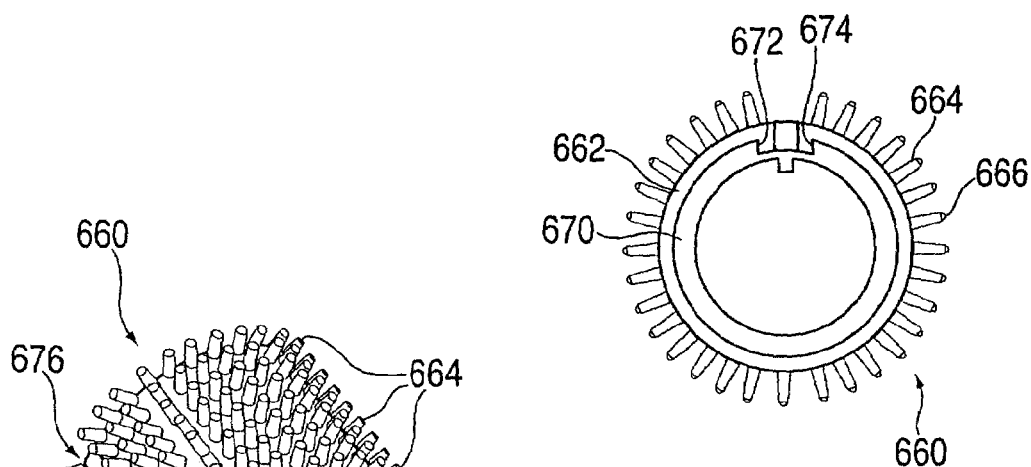
FIG. 31 is an end view of the cleaning element shown in FIG. 30.
Figure 30:
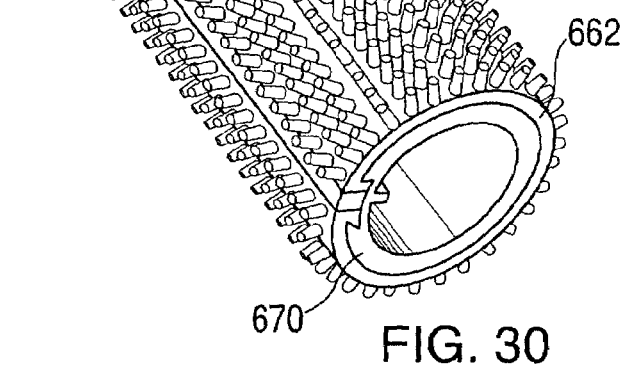
FIG. 30 is a perspective view of another aspect of a cleaning element.

One such grooming element 660 is shown in FIGS. 30 and 31. The element 660 is in the form of a mat or pad having a generally cylindrical shape when in a use position. The pad 660, in this aspect is formed of a resilient material, such as an elastomer, rubber, or soft plastic having a substrate 662 from which radially project a plurality of conical or cylindrical bristles 664. The bristles 664 are each resilient themselves and are arranged in close proximity to cover a substantial portion of the exterior of the substrate 662. As shown in FIG. 31, a small nib 666 may optionally be formed on the end of each bristle 664.

The substrate 662 and the bristle 664 may be molded or otherwise formed as a unitary; homogeneous member in either a sheet form or a closed, continuous cylindrical form. The use of a sheet form for the pad 660 enables mounting of the pad 660 over a generally tubular or cylindrical core 670. The core 670 has a longitudinally extending clamp groove formed by opposed clamp surfaces 672 and 674. Clamp surfaces 672 and 674, which form one-half of a dove-tail shape, are adapted for receiving mating angled ends of the substrate 662 which snap-fit into the clamp groove to mount the substrate 662 about the core 670.

Figure 32:
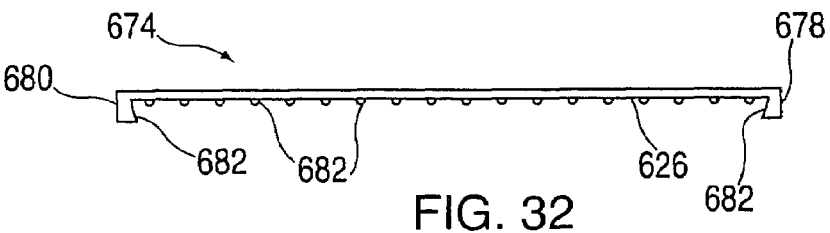
FIG. 32 is a side elevational view of the mat usable with the cleaning element shown in FIG. 30.

A separate clamp 676 may then be mounted over any area or portion of the substrate 662. In one aspect, the clamp 626 is mounted over a void or empty space along a longitudinal portion of the substrate 662, shown in FIG. 30. The clamp 674 which is shown in greater detail in FIG. 32, is formed of a resilient material, such as an elastomer, rubber, soft plastic, etc. and has a strip-like main portion 676 with first and second opposed ends 678 and 680. The strip portion 676 may include inward extending teeth or projections 682 to facilitate engagement with the substrate 662. The first and second ends 678 and 680 of the clamp 674 have inward extending ends with teeth or serrations 682 on an inner surface. The first and second ends are adapted to engage recesses formed at the end of the clamp groove in the core 670, as shown in FIGS. 30 and 31 to snap-fit the clamp 674 on the pad 660 so as to cover and retain the ends of the pad 660 in place on the corre 670. Optional teeth or projections form complementary to the teeth 682 on the inner surface of the ends 678 and 680 of clamp 674 may be formed in opposite ends of the core 670 to facilitate a secure, but releasable attachment of the clamp 674 to the core 670.

The pad 660 is useful for deep grooming.

Figure 33:
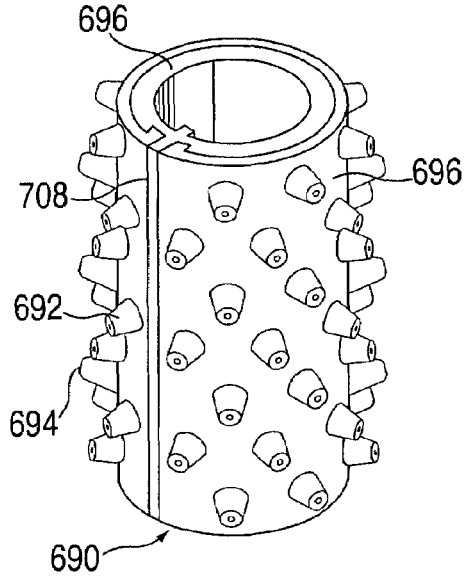
FIG. 33 is a perspective view of another aspect of a cleaning element.
Figure 34:
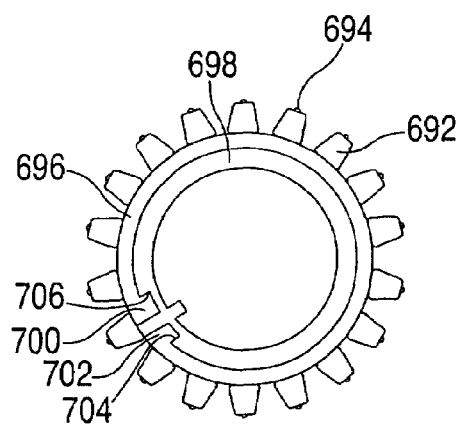
FIG. 34 is an end view of the cleaning element shown in FIG. 33.
Figure 35:
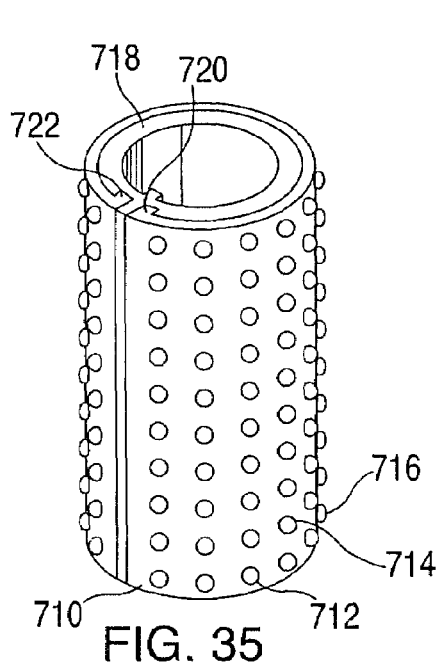
FIG. 35 is a perspective view of another aspect of a cleaning element.
Figure 36:
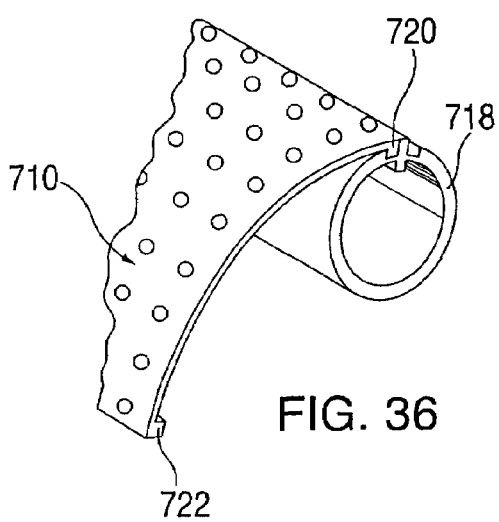
FIG. 36 is a partial, perspective end view of the cleaning element or mat shown in FIG. 35, depicted in a partially assembled position about a core.

Referring now to FIGS. 33 and 34, there is depicted another mat or pad 690 mountable on the one of the spindles of the present invention. The pad 690 includes a plurality of larger conical shaped projections 692, each terminating in a small nib 694, by example only. The conical shaped projection 692 are somewhat randomly spaced about a substrate 696 with which they form a homogeneous body. The substrate 696 may be formed as a continuous, closed cylindrical member, or as shown in FIGS. 34-36, as a sheet which wrapped around a tubular or cylindrical core 698. Opposed ends 700 and 702 of the sheet 696 are complementary shaped to inverted angled edges 704 and 706 in a longitudinally extending discontinuity in the core 698 so as to mount the ends of the substrate 696 in the core 698 in a snap-fit. In this aspect, a thin rib 708 extends from the core 698 intermediate the inward facing edges 704 and 706 to separate the ends of the substrate 696 as shown in FIGS. 33 and 34.

The pad 690 is useful in deep grooming and massaging pets.

In FIGS. 35 and 36, there is depicted a similar pad 710 with a plurality of smaller projections 712 closely spaced on a substrate 714. Each projection 712 terminates in an end nib 716, again by example only. The substrate 714 is mounted on a core 718 by means of complementary recesses for receiving the dove-tail shaped ends 720 and 722 of the sheet-like substrate 714 in a snap-in fit in the same manner as described above.

Figure 37:
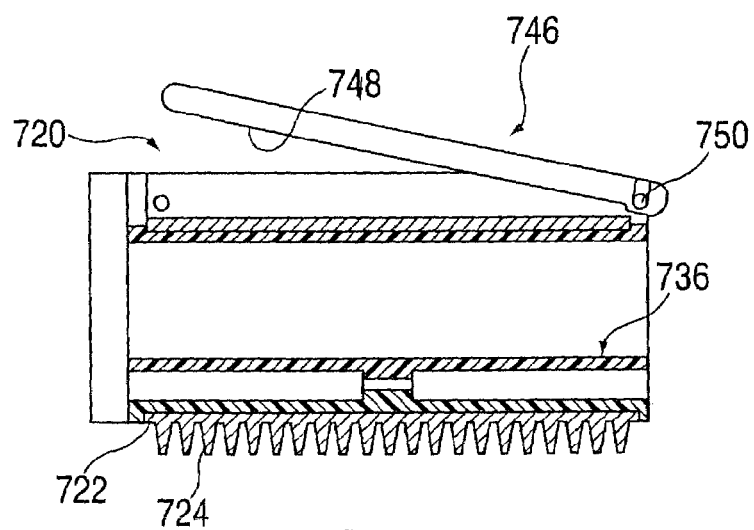
FIG. 37 is a partially cross-sectioned, side elevational view of another aspect of a cleaning element or mat with a pivotal clamp.

FIG. 37 depicts an alternate pad 720 according to another aspect of the present invention. The pad 720 includes a substrate 722 from which extend a plurality of generally conical shaped nibs 724 similar to the nibs 664 shown in FIG. 30. The substrate 722 is by way of example only, divided in a sheet-like form with opposed ends terminating in fingers which are spaced from the main portion of the substrate 722 by a slots. The substrate 722 is mountable around a core 736 which has a generally tubular, cylindrical cross section.

The core 736 includes end fingers which are circumferentially spaced apart and are adapted for engaging the slot formed in the core 736 to mount the substrate 722 to the core 736. When the ends of the substrate 722 are mounted on the core 736, the inward facing surfaces of the ends will be spaced apart by a channel.

A pivotal clamp member 746 in the form of an elongated bar which may have a smooth or toothed inner edge 748 pivotally connected at one end 750 to the core 736 by means of a pivot pin. The clamp 746 is pivotal from a first open position shown in FIG. 37 allowing mounting or dismounting of the substrate 722 on the core 736 and a second closed position in which the inner surface 748 of the clamp 746 engages an inner surface of the core 736. In this closed or second position, the clamp 746 is positioned between the inward facing ends of the substrate 722 thereby preventing dislodgement and separation of the ends of the substrate 722 from the core 736.

Figure 38:
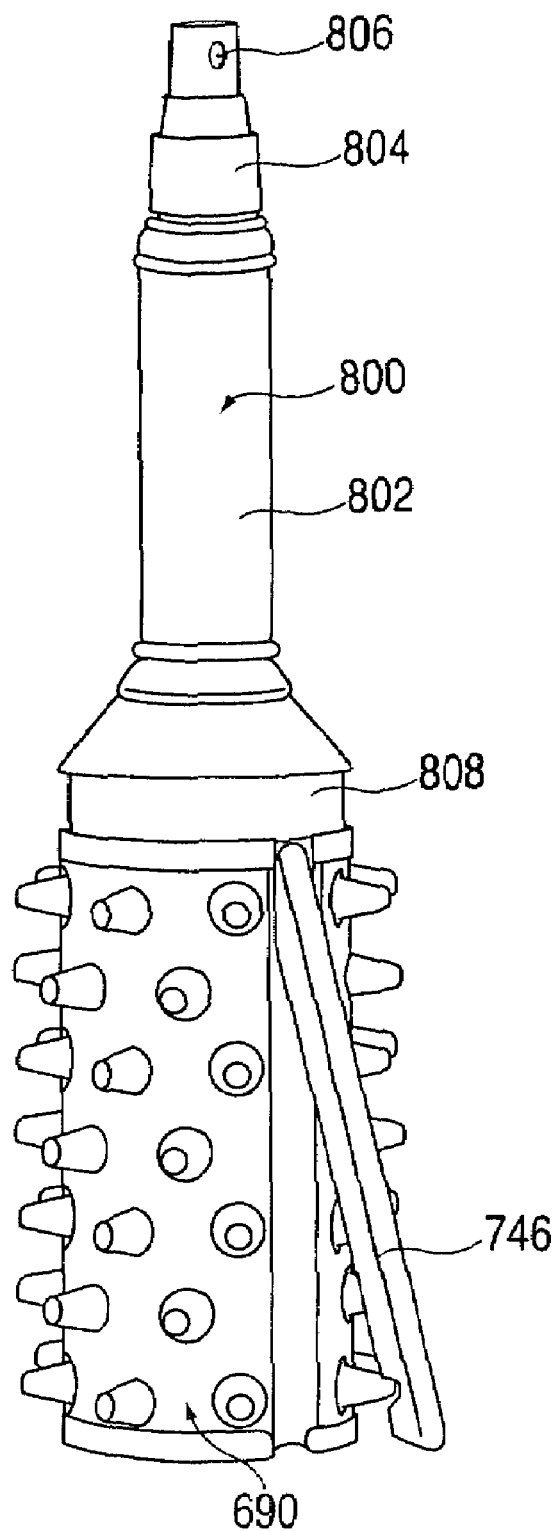
FIG. 38 is a perspective view of another aspect of a cleaning apparatus.

There is depicted in FIG. 38 an example of a fluid dispenser 800 in the form of one of the dispensers described above, such as with a hollow handle 852 defining an interior chamber. One end of the handle 802 receives an attachable actuator 804 for dispensing fluid contents within the handle 802 through a discharge outlet 806.

The circular or oval cross-sectioned support 808 receives any of the mats described above, with mat 690 being shown by way of example only. The pivotal lever 746 is mounted on the mat 690 and engages a channel in the support 808 to fix the wipes on the mat 670.

Turning now to FIGS. 39-48, there is depicted another aspect of a cleaning apparatus denoted generally by reference number 150.

The cleaning apparatus 150 includes a two-part injection molded handle 152 formed of substantially identical, mating handle sections 154 and 156. Projections 158 on one of the handle sections, such as handle section 154 snap into or are heat or sonic welded to mating apertures or sections in the opposed handle section 156 to integrally join the handle sections 154 and 156 to form the completed handle 152. The handle 152 has a generally ergonomically shaped hand engagable end 158 and a bristle/wipe support 160 extending therefrom. The support 160 has a generally wedge or tapered shape extending from a larger outer diameter end 162 adjacent the handle 158 to a substantially pointed apex 164 at an opposite end.

Figure 47:
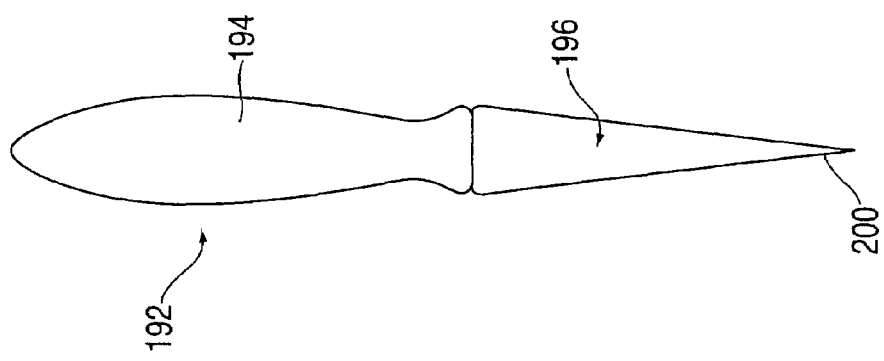
FIG. 47 is a side elevational view of an alternate handle and support.

As seen in a transverse view shown in FIGS. 44 and 47, the support section 160 has a generally polygonal or rectangular shape.

A mat 161, shown in FIGS. 39 and 40, has a polygonal configuration complementary to the shape of the joined support sections 160 of the handle 152. The mat 161 is formed of a molded plastic material and has a thinned or hinged section 162 formed intermediate opposed ends 164 and 166. A plurality of bristles 168 are formed on each of the two sections 170 and 172 of the mat 161.

Although the mat 161 may be employed by itself for grooming, wipes 120, as described above, may be mounted over the bristles 168 to apply a cleaning, polishing or medicament solution.

Each wipe 120, as described in detail above and shown in FIG. 41, includes a plurality of large diameter apertures 124 which are arranged in the same two dimensional pattern as the bristles 168 on the mat 161. This enables one or more wipes 120 to be applied over the bristles 168 and retained thereon. One end of each wipe 120 includes a pull tab 126 for removing an outermost wipe from a stack of wipes mounted on the mat 161.

Mounting apertures 174 are formed in the larger diameter end 162 of the support 160, and are provided on opposite sides of the support 160. The apertures 174 receive lock projections 176 formed at opposite ends of the mat 161 to releasably mount the mat 161 on the support 160.

An optional angled lip 180 may be formed at the end 166 of the mat 161. The lip 180 extends angularly from the adjacent planar portion of the mat 161 to bend the pull tabs 124 on the stack of wipes 120 outward to a more easily grasped position.

In assembling the cleaning apparatus 150, the wipes 120 are inserted over the bristles 168 of the mat 161. The mat 161 is then bent into the angular configuration shown in FIG. 44 about the hinge 162 and is urged over the support 160 of the handle assembly 150 until the projections 176 can be lockably inserted into the apertures 174 on the support 160. The completely assembled cleaning apparatus 150 is shown in FIG. 45.

Figure 48:
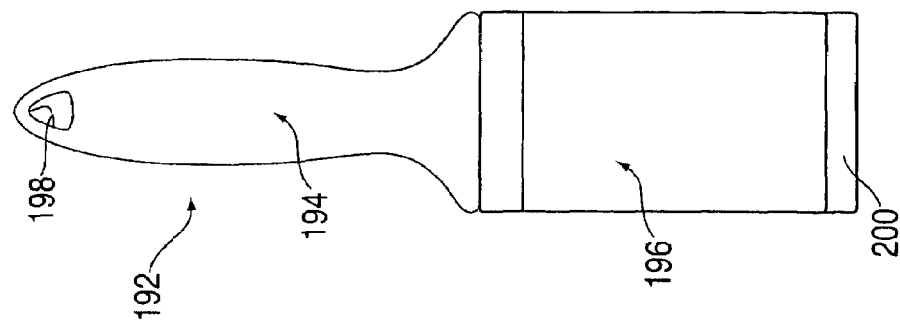
FIG. 48 is a front elevational view of the handle and support shown in FIG. 47.
Figure 46:
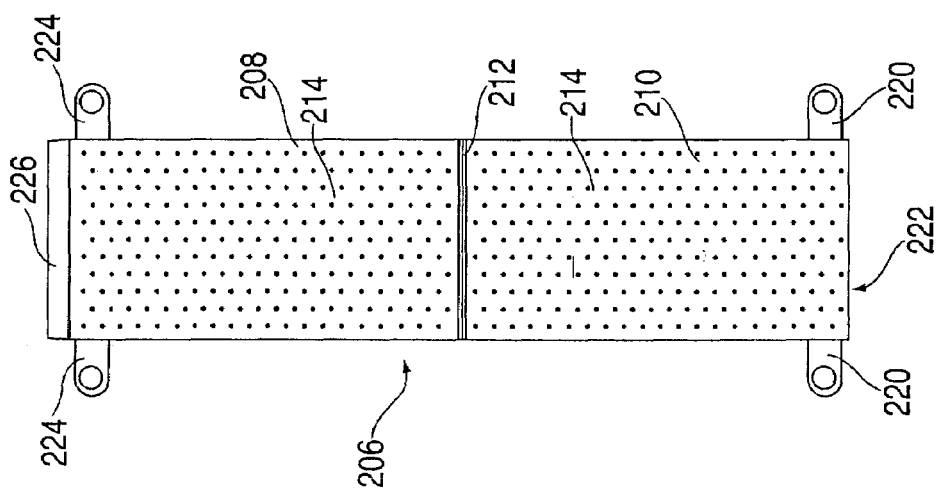
FIG. 46 is a plan, expanded view of an alternate mat.

A modified cleaning apparatus 190 is shown in FIGS. 46-48. The cleaning apparatus 190 includes a handle/support member 192 having a handle section 194 and a cleaning element support section 196.

Although the handle/support assembly 192 may be formed of the two joinable sections, as shown in FIG. 42, in this aspect of the cleaning apparatus of the present invention, the handle/support assembly 192 is formed as a one-piece, blow molded handle 194 and support 196 as shown in FIGS. 47-48.

The handle 194 is formed in an ergonomic hand configuration and may have a mounting or hanging aperture 198 at one end. The support section 196 transitions from the handle section 194 and has, by example only, a tapered cross section terminating in a point or apex 200. The lateral shape of the support 196 is generally polygonal or rectangular as shown in FIG. 48.

A mat 206 is substantially identical to the mat 161 and includes mat sections 208 and 210 separated by a narrowed down or thin hinge section 212. Bristles 214 are integrally formed in and extend outward from each mat section 208 and 210.

Instead of mating projections 176 and apertures 174 to lock the folded mat 206 on the support, in this aspect, the mat 206 is formed with mating snap tabs 220 at a first end 222 of the mat 206 and 224 at an opposite or second end 226 of the mat 206. The lock portions 220 and 224 may include conventional snaps as well as mating projections and apertures.

The mat 206, after being in an elongated, flattened state, and loaded with wipes 120 as described above and shown in FIG. 40, is folded about the hinge 212 into the angular, wedge shape and inserted about the spaced ends 222 and 226 over the support 196 until the hinge 212 substantially abuts the apex 200 on the support 196. In this position, the lock members 220 and 224 are engaged to releasably lock the mat 206 on the support 196.

The two part handle 152 lends itself to the formation of a hollow cavity which receives a slide or plug in fluid dispenser container or cartridge, such as an aerosol cartridge. The cartridge may be mounted in the handle 152 by a friction fit or releasably interlocking projections or nibs and grooves.

Alternately, the entire handle 152 and support 160 may be molded, such as blow molded, into a one piece body. This aspect lends itself to forming the at least the handle 200 if not the entire handle 200 and support 202 as a hollow chamber which receives a closable cap carrying the actuator/discharge outlet.

Figure 49:
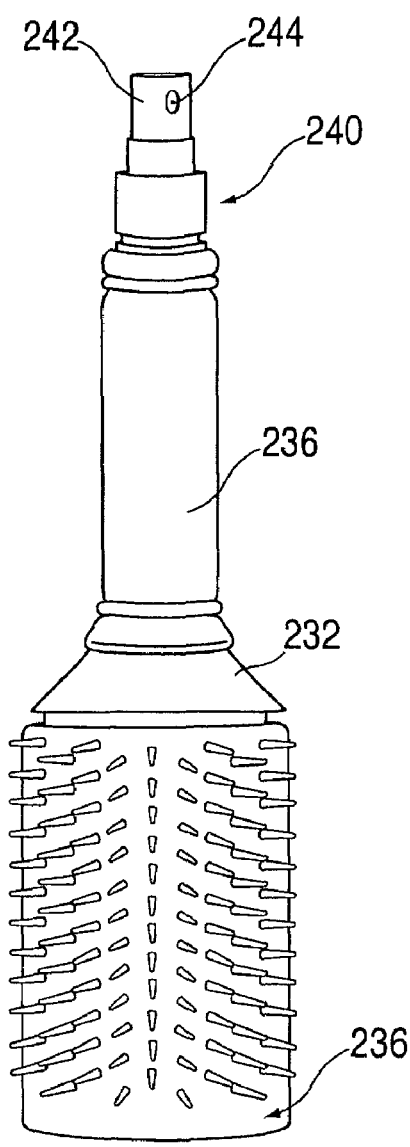
FIG. 49 is a front elevational view of another aspect of a cleaning apparatus.
Figure 50:
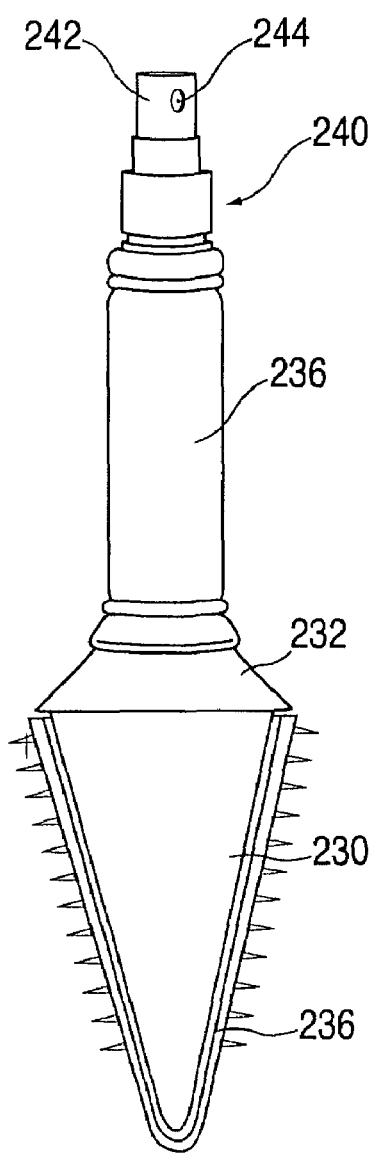
FIG. 50 is a side elevational view of the cleaning apparatus shown in FIG. 49.

Referring now to FIGS. 49 and 50, there is depicted another aspect of a cleaning apparatus in which a wedge shaped support 230 extends from a conical collar 232. A bristle mat 234, constructed as described above and shown in FIG. 44, is mounted on the support 230 by a snap-on connection formed by interlocking projections and recesses, not shown. The mat 234 may carry one or a stack of wipes 236, also as described above.

Integrally formed with the support 230 and extending from the collar 232 is a hollow, cylindrical body 236 which may form a handle. The body 236, which may be formed of metal or plastic, has a hollow interior. One end of the body 236 may be threaded or otherwise formed to removably receive a dispenser means 240. The dispenser means 240 may include a manually depressable plunger 242 which pumps fluid contained within the body 236 and, ultimately, also within the support 230 where the support 230 is formed of a hollow interior communicating with the body 236, through a discharge outlet 244.

It will be understood that the body 236 may also be formed with an open end for slidably receiving an entire aerosol or other fluid dispensable container or a slide-in, friction or snap-together fit.

What is claimed is:

1. A brush assembly comprising:
   a body having a handle portion and a head portion attached coaxially to said handle portion, said head portion having a tubular body with an outer surface circumferentially surrounding said tubular body;
   a replaceable cleaning element including a mat having a flexible base disposed circumferentially around said outer surface, said flexible base having a first surface that contacts said outer surface of said head portion and an opposite second surface, a plurality of bristles attached to and extending upwardly from said opposite second surface of said flexible base and terminating in two opposed edges, and
   a securing element for releasably attaching said replaceable cleaning element to said head portion such that said replaceable cleaning element is circumferentially wrapped around said outer surface of said head portion; wherein said securing element includes straps attached to and extending from one of said edges and engaging and overlapping said other edge, wherein said securing element further includes at least one projection on one of said straps and said flexible base and an aperture formed in the other of said straps and said flexible base, said aperture being sized to accept and engage said projection to secure said replaceable cleaning element on said head portion.

2. The brush assembly of claim 1 wherein said head portion has an elliptical cross section.

3. The cleaning apparatus of claim 1 wherein said bristles are disposed perpendicularly to said base.

4. The cleaning apparatus of claim 1 wherein said base is generally flat and rectangular before it is mounted on said head portion.

* * * * *